United States Patent
Tsuchino et al.

(10) Patent No.: US 8,580,368 B2
(45) Date of Patent: Nov. 12, 2013

(54) INFORMATION RECORDING MEDIUM AND METHOD FOR MANUFACTURING THE SAME

(75) Inventors: Akio Tsuchino, Osaka (JP); Takashi Nishihara, Osaka (JP); Hideo Kusada, Osaka (JP); Rie Kojima, Nara (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/639,011

(22) PCT Filed: Feb. 24, 2012

(86) PCT No.: PCT/JP2012/001301
§ 371 (c)(1),
(2), (4) Date: Oct. 2, 2012

(87) PCT Pub. No.: WO2012/120816
PCT Pub. Date: Sep. 13, 2012

(65) Prior Publication Data
US 2013/0071600 A1 Mar. 21, 2013

(30) Foreign Application Priority Data

Mar. 8, 2011 (JP) ................. 2011-049902
Mar. 11, 2011 (JP) ................. 2011-054205
Mar. 31, 2011 (JP) ................. 2011-079692

(51) Int. Cl.
*G11B 7/24* (2013.01)
(52) U.S. Cl.
USPC .............. 428/64.1; 428/64.4; 430/270.11
(58) Field of Classification Search
USPC ................... 428/64.4; 430/270.11
See application file for complete search history.

(56) References Cited

U.S. PATENT DOCUMENTS

| | | |
|---|---|---|
| 7,498,069 B2 | 3/2009 | Ohkubo |
| 7,645,499 B2 | 1/2010 | Habuta et al. |

(Continued)

FOREIGN PATENT DOCUMENTS

| | | |
|---|---|---|
| EP | 2 455 938 | 5/2012 |
| JP | 62-289937 | 12/1987 |

(Continued)

OTHER PUBLICATIONS

International Search Report issued Jun. 5, 2012 in International (PCT) Application No. PCT/JP2012/001302.

(Continued)

*Primary Examiner* — Elizabeth Mulvaney
(74) *Attorney, Agent, or Firm* — Wenderoth, Lind & Ponack, L.L.P.

(57) ABSTRACT

An optical information recording medium including three or more information layers, wherein at least one information layer provided on the light incident side is an information layer which enables information to be overwritten and includes a recording film, a transmittance adjusting film of a dielectric containing Bi, Ti and O, and an isolation film in this order from a light incident side; and the isolation film is provided between and adjacent to the transmittance adjusting film and an intermediate separation layer which separate the information layer from another information layer on the side opposite to the light incident side; and the isolation film has an optical constant at a wavelength of 405 nm such that a refractive index is 1.8 or less and an extinction coefficient is 0.05 or less. This information recording medium prevents the repeated overwriting characteristics in a sever environment from being deteriorated.

12 Claims, 1 Drawing Sheet

(56) References Cited

U.S. PATENT DOCUMENTS

| | | |
|---|---|---|
| 7,709,073 B2 | 5/2010 | Kojima et al. |
| 2004/0076908 A1 | 4/2004 | Oomachi et al. |
| 2004/0105182 A1 | 6/2004 | Nishihara et al. |
| 2004/0166440 A1 | 8/2004 | Tabata et al. |
| 2006/0083150 A1* | 4/2006 | Sakaue et al. .......... 369/125 |
| 2009/0141615 A1 | 6/2009 | Nakai et al. |
| 2010/0046346 A1* | 2/2010 | Kusada et al. .......... 369/100 |
| 2010/0203280 A1 | 8/2010 | Ota et al. |
| 2010/0291337 A1 | 11/2010 | Suwabe et al. |
| 2011/0151277 A1 | 6/2011 | Nishihara et al. |
| 2011/0177280 A1 | 7/2011 | Tsuchino et al. |

FOREIGN PATENT DOCUMENTS

| | | |
|---|---|---|
| JP | 63-225934 | 9/1988 |
| JP | 63-225935 | 9/1988 |
| JP | 63-259855 | 10/1988 |
| JP | 1-303643 | 12/1989 |
| JP | 4-286733 | 10/1992 |
| JP | 2584741 | 2/1997 |
| JP | 2002-293025 | 10/2002 |
| JP | 2003-145944 | 5/2003 |
| JP | 2004-139690 | 5/2004 |
| JP | 2004-185731 | 7/2004 |
| JP | 2004-199786 | 7/2004 |
| JP | 2004-255698 | 9/2004 |
| JP | 2005-149616 | 6/2005 |
| JP | 2006-51803 | 2/2006 |
| JP | 2009-134833 | 6/2009 |
| JP | 4339356 | 10/2009 |
| JP | 2010-186516 | 8/2010 |
| JP | 2010-267359 | 11/2010 |
| WO | 03/025922 | 3/2003 |
| WO | 2004/034390 | 4/2004 |
| WO | 2009/096174 | 8/2009 |
| WO | 2010/095467 | 8/2010 |
| WO | 2011/007841 | 1/2011 |
| WO | 2011/024381 | 3/2011 |

OTHER PUBLICATIONS

International Search Report issued May 29, 2012 in International (PCT) Application No. PCT/JP2012/001301.

* cited by examiner

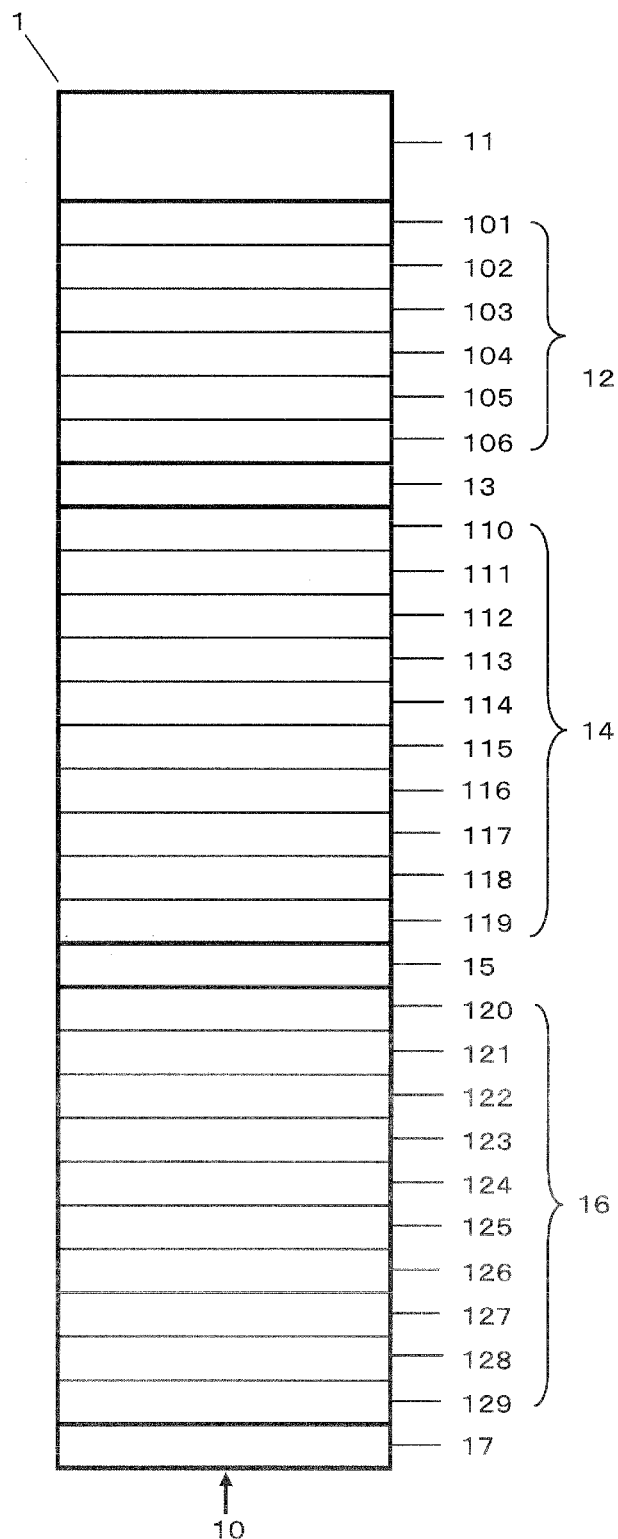

INFORMATION RECORDING MEDIUM AND METHOD FOR MANUFACTURING THE SAME

TECHNICAL FIELD

The present invention relates to an information recording medium from which information is recorded or reproduced by an optical system, and a method for manufacturing the same.

BACKGROUND ART

An aspect of optical information recording media is a phase-change information recording medium in which information is recorded, erased or rewritten by an optical system using laser beam. Examples of currently commercialized phase-change information recording medium include Blu-ray Disc media. More specifically, BD-RE media having two layers on one side (storage capacity of 50 GB, transfer rate of 36 Mbps (1× speed)) are commercialized as large capacity media capable of recording digital high-vision images.

The BD-RE media having two layers on one side includes two information layers, for example, a full reflection information layer L0 located far from the laser beam incident side, and a semi-transmission information layer L1 located on the laser beam incident side. The semi-transmission information layer is configured, for example, with a transmittance adjusting film, a reflective film, a dielectric film on the reflective film side, a first interface film, a recording film, a second interface film and a dielectric film on the incident side that are disposed in this order on a surface of an intermediate separation layer.

The transmittance adjusting film has a function of adjusting the transmittance of the information layer. Formation of this film using a material having a large refractive index enables an increase in transmittance of the information layer, and also enables the transmittance of a recording film in a crystal phase and the transmittance of a recording film in an amorphous phase to become closer to each other (see Patent Literature 1). In double layer BD-RE media, $TiO_2$ has been used as the material of the transmittance adjusting film.

In order to achieve further increases in record contents for the future, promotions for PC applications, resource savings taking environment aspect into consideration and space savings, it is required for BD-RE media to increase capacity per disc. Examples of the method of increasing the capacity per disc include further increase in information layers to be laminated (multilayering) and further increase in storage capacity per information layer (high density recording). For the purpose of multilayering of the information layer, it is necessary to increase the transmittance of the semi-transmission information layers that are located nearer to the laser beam incident side, so as to read out information (in a high S/N ratio) from the information layer that is located farthest from the laser beam incident side.

To this end, it is necessary that a transmittance adjusting film is formed of a material that shows no absorption and has higher refractive index. Examples of typical material include oxides of Bi and Ti disclosed in Patent Literature 2. This material has a refractive index of more than 2.7 at a wavelength of 405 nm, and can further improve the transmittance of an information layer as compared with a conventional material. Accordingly, it is considered that this material is a material that will be widely applied in a multi-layered information recording medium in the future.

A recording film is formed of a phase change material that causes reversible change between crystalline and amorphous phases. Such a material is, for example, a material that is composed of three elements Te, Bi and Ge, and has a composition located on a line extending between $Ge_{50}Te_{50}$ and $Sb_{40}Te_{60}$ in a ternary diagram (see Patent Literature 3); a material that has a composition located on a line extending between $Ge_{50}Te_{50}$ and $Bi_{40}Te_{60}$ in a ternary diagram, a part of Bi being replaced with Sb (see Patent Literature 4); or a material that contains Sb as a main component (in the vicinity of 70 atomic %), and has a composition in the vicinity of an eutectic point of SbTe as a base (see Patent Literature 5).

Generally, information is recorded by irradiating the recording film with high-power (recording-power) laser beam thereby to heat the recording film to a higher temperature than its melting point, resulting in melting of the irradiated region, and then cooling rapidly to form an amorphous phase. In contrast, information is erased by irradiating the recording film with lower-power (erasing-power) laser beam than that used for recording thereby to heat the recording film to a temperature that is higher than its crystallization temperature but is lower than its melting point, resulting in temperature raise of the recording film, and then cooling slowly the recording film to form a crystalline phase. These crystallized region and amorphous region thus formed differ in reflectance from each other, and thus information can be reproduced using the difference in reflectance. Accordingly, higher quality reproduced signals can be obtained as a difference in reflectance increases.

A dielectric film on the reflective film side and dielectric film on the incident side have a function of adjusting an optical distance (=refractive index×physical distance) of an information layer thereby to increase light absorption efficiency of the recording film and to increase a difference between a reflectance in a crystal phase and a reflectance in an amorphous phase, and thus increasing the signal amplitude. These dielectric films also have a function of protecting a recording film from moisture. Examples of the materials of these dielectric films include a mixture of 80 mol % ZnS and 20 mol % $SiO_2$ (hereinafter referred to as $(ZnS)_{80}(SiO_2)_{20}$) (see, for example, Patent Literature 6 and Patent Literature 7). This material is an amorphous material, and has characteristics such as low thermal conductivity, high refractive index and high transparency. The material also shows high film formation rate during film formation, and is also excellent in mechanical characteristics and moisture resistance. Because of its excellent characteristics, $(ZnS)_{80}(SiO_2)_{20}$ has been put into practical use as a material that is remarkably suited for forming a dielectric film.

CITATION LIST

Patent Literature

Patent Literature 1 WO 2003/025922
Patent Literature 2 WO 2009/096174
Patent Literature 3 JP-A-63-225934
Patent Literature 4 JP-A-63-225935
Patent Literature 5 JP-A-1-303643
Patent Literature 6 JP-A-62-289937
Patent Literature 7 JP-A-63-259855

SUMMARY OF INVENTION

Technical Problem

The present inventors have paid attention to an action between an intermediate separation layer (resin layer) and a transmittance adjusting film of an oxide dielectric of Bi and Ti in a phase-change information recording medium and found a problem in a conventional configuration, and they have made a trial of the improvement.

As mentioned in Background Art, it is considered that, in a semi-transmission information layer of a multi-layered information recording medium, oxides of Bi and Ti that have a high refractive index, are suited for a material of the transmittance adjusting film so as to improve the transmittance. In a conventional configuration, the transmittance adjusting film is provided adjacent to the intermediate separation layer. It was found that, when information is repeatedly recorded on this information recording medium under severe environment such as environment at a temperature of 50° C., repeating cycle characteristics are inferior. The results of detailed evaluation and analysis revealed that any deterioration of repeating cycle characteristics is not recognized under normal environment in which media are used and deterioration is recognized only under severe environment (at high temperature of 50° C.). It was also found that deterioration of repeating characteristics is not caused by a decrease in erase rate due to overwrite of signals, but caused by deterioration of shelf characteristics due to continuation of irradiation with reproduced light. Shelf characteristics due to continuation of irradiation with reproduced light are determined by a period until degradation occurs in the portions where signals are not recorded (unrecorded portion) when the portions are continuously irradiated with reproduced light.

Deterministic causes for deterioration of shelf characteristics due to continuation of irradiation with reproduced light have not been elucidated. However, as mentioned above, deterioration of crystallizability of a recording material is not recognized, and thus it was considered that the composition may vary or degradation of the material may occur in the recording film or in the periphery thereof. Even if the temperature of the film when irradiated with reproduced light is estimated, the temperature of any film does not rise to the temperature at which structural change or decomposition of the film occurs. Accordingly, present inventors consider that a specific interaction may occur between some of layers by an optical action and/or a thermal action, and made a study of formation of a new film that enables isolation between layers where such an interaction occurs. Herein, a structural change due to the temperature of the film was analyzed by XRD (X-ray diffraction).

As a result, it has been found that a specific interaction may occur between an intermediate separation layer and a film adjacent thereto, particularly between a transmittance adjusting film containing oxides of Bi and Ti and an intermediate separation layer. Thus, the present inventors made a study of formation of a film between the transmittance adjusting film and the intermediate separation layer. During the process of the study, they have found it necessary to select a layer, that is newly formed, so as to maintain characteristics of a medium under the environment where an information recording medium is usually used, and to make a refractive index and an extinction coefficient closer to those of an intermediate separation layer, so as to remove the influence of multiple reflection and diffraction in the configuration of a multi-layered thin layer.

The present invention has been made so as to solve the above-mentioned problems and an object thereof is to provide an information recording medium, that exhibits more satisfactory repeated overwriting performances under more severe environment, as compared with a multi-layered information recording medium configured such that a transmittance adjusting film containing oxides of Bi and Ti is provided adjacent to an intermediate separation layer.

Solution to Problem

In order to achieve the above object, the present invention provides an information recording medium including three or more information layers and being capable of recording and reproducing information by irradiation with light, wherein at least one information layer provided on the light incident side is an information layer capable of overwriting information and includes at least a recording film, a transmittance adjusting film of a dielectric containing Bi, Ti and O, and an isolation film in this order from the light incident side; the isolation film is provided between and adjacent to the transmittance adjusting film and an intermediate separation layer that separates the information layer from another information layer on the side opposite to the light incident side; and the isolation film has an optical constant at a wavelength of 405 nm such that a refractive index is 1.8 or less and an extinction coefficient is 0.05 or less.

The present invention also provides a method for manufacturing an information recording medium including three or more information layers and being capable of recording and reproducing information by light, the method including three or more steps of forming an information layer and, wherein the step of forming at least one information layer provided on the light incident side includes a step of forming a transmittance adjusting film of a dielectric containing Bi, Te and O, a step of forming an isolation film and a step of forming a recording film capable of causing reversible phase change between a crystal phase and an amorphous phase by irradiation with light;

the step of forming the isolation film is continuously carried out after forming an intermediate separation layer which separates the information layer from another information layer on the side opposite to the light incident side, and includes sputtering of a target so as to obtain a film which has an optical constant at a wavelength of 405 nm such that a refractive index is 1.8 or less and an extinction coefficient is 0.05 or less; and the step of forming the transmittance adjusting film is continuously carried out after forming the isolation film, and includes sputtering of a target of a dielectric containing Bi, Ti and O.

Advantageous Effects of Invention

The multi-layered information recording medium of the present invention is characterized in that an isolation film having a low refractive index is provided between an intermediate separation layer and a transmittance adjusting film. According to this feature, it is possible to suppress deterioration of shelf characteristics of a medium, caused by irradiation with reproduced light at high temperature, and thus achieving satisfactory repeated overwriting characteristics under severe environment. According to the method for manufacturing an information recording medium of the present invention, it is possible to manufacture an information recording medium having the above-mentioned effects.

BRIEF DESCRIPTION OF DRAWINGS

FIG. 1 is a partial cross-sectional view of an information recording medium 1 in the first embodiment of the present invention.

DESCRIPTION OF EMBODIMENTS OF THE INVENTION

The information recording medium of the present invention (also referred to as either a "recording medium" or a "medium" in the present description including the following descriptions) is an information recording medium including three or more information layers, and being capable of recording and reproducing information by irradiation with light (i.e., optical information recording medium), wherein at least one information layer provided on the light incident side is an information layer capable of overwriting information and includes at least a recording film, a transmittance adjusting film of a dielectric containing Bi, Ti and O, and an isolation film in this order from the light incident side; the isolation film is provided between and adjacent to the transmittance adjusting film and an intermediate separation layer that separates the information layer from another information layer on the side opposite to the light incident side; the isolation film has an optical constant at a wavelength of 405 nm such that an refractive index is 1.8 or less and an extinction coefficient is 0.05 or less. This optical constant is close to that of an intermediate separation layer, and ensures that the direction and amount of laser beam, that passes through the transmittance adjusting film to reach the intermediate separation layer when the isolation film is provided, are not largely different from those of laser beam when the isolation film is not included. The information layer including such an isolation film exhibits satisfactory repeating characteristics at high temperature while having high light transmission properties.

The isolation film preferably contains an oxide of at least one element selected from Si and Al. An information layer including an isolation film containing oxide(s) of Si and/or Al has moisture resistance that is equivalent to that of an information layer including no isolation film. Namely, the isolation film containing oxide(s) of Si and/or Al does not cause or hardly cause deterioration of moisture resistance of a recording medium due to the addition of the isolation film.

The isolation film is preferably an isolation film that is substantially made of $SiO_2$ or $Al_2O_3$, or $Al_6Si_2O_{13}$ (a complex oxide of Al and Si). The information layer including such an isolation film can have the transmittance that is equivalent to that of an information layer including no isolation film, and gives an information recording medium that neither causes a decrease in reflectance nor deterioration of record sensitivity, or that causes less decrease in reflectance and less deterioration of record sensitivity of an information layer located far from the light incident side.

In order to further improving repeated overwriting characteristics of a medium by allowing to exhibit isolation properties more effectively, the isolation film preferably has a thickness of 3 nm or more. In contrast, when the isolation film has large thickness, productivity of the medium deteriorates. Accordingly, the isolation film preferably has a thickness of 20 nm or less.

At least one information layer that is disposed on the light incident side and includes the isolation film is preferably one including at least a third dielectric film, a second dielectric film, the recording film and a first dielectric film in this order from the light incident side, wherein the third dielectric film is provided between and adjacent to the second dielectric film, and an intermediate separation layer which separates the information layer from another information layer on the light incident side or a cover layer which protects the information layer; the second dielectric film contains ZnS and $SiO_2$; and the third dielectric film has an optical constant at a wavelength of 405 nm such that a refractive index is 1.8 or less and an extinction coefficient is 0.05 or less. In the information layer including, in addition to the isolation film, the third dielectric film provided adjacent to the above specific second dielectric film, higher heat release effect is obtained, whereby, repeated overwriting characteristics of the medium are improved. In the information layer disposed nearest to the light incident side of the medium, a third dielectric film is provided between and adjacent to the second dielectric film and the cover layer.

The third dielectric film preferably contains an oxide of at least one element selected from Si and Al. The information layer including the third dielectric film containing oxide(s) of Si and/or Al has moisture resistance that is equivalent to that of an information layer including no third dielectric film. Namely, the third dielectric film including oxide(s) of Si and/or Al does not cause deterioration of moisture resistance of a recording medium, or hardly causes deterioration of moisture resistance of a recording medium due to the addition of the third dielectric film.

The third dielectric film is preferably made of $SiO_2$ or $Al_2O_3$, or $Al_6Si_2O_{13}$ (a complex oxide of Al and Si). The information layer including such a third dielectric film has the transmittance that is equivalent to that of an information layer including no third dielectric film, and gives an information recording medium that neither causes a decrease in reflectance nor deterioration of record sensitivity, or causes less decrease in reflectance and less deterioration of record sensitivity of an information layer located far from the light incident side.

The third dielectric film preferably has a thickness of 5 nm or more and 20 nm or less. The third dielectric film having such a thickness is suited for the improvement of repeated overwriting characteristics.

A method for manufacturing an information recording medium of the present invention will be described below. The method for manufacturing an information recording medium of the present invention includes three or more steps of forming an information layer, wherein the step of forming at least one information layer includes the step of forming a transmittance adjusting film of a dielectric containing Bi, Ti and O, the step of forming an isolation film and the step of forming a recording film capable of causing reversible phase change between a crystal phase and an amorphous phase by irradiation with light;

the step of forming the isolation film is continuously carried out after forming an intermediate separation layer which separates the information layer from another information layer on the side opposite to the light incident side, and includes sputtering of a target so as to obtain a film which has an optical constant at a wavelength of 405 nm such that a refractive index is 1.8 or less and an extinction coefficient is 0.05 or less; and the step of forming the transmittance adjusting film is continuously carried out after forming the isolation film, and includes sputtering of a target of a dielectric containing Bi, Ti and O. In the present description, "continuously carrying out" the steps of forming two layers or films means that the step of forming another film or layer is not substantially present between two steps. It is possible to obtain the configuration wherein layers are in contact with each other in a thickness direction by carrying out two steps in such a manner.

A target that is used to form the isolation film is preferably made of $SiO_2$ or $Al_2O_3$, or $Al_6Si_2O_{13}$ (a complex oxide of Al and Si).

It is preferred that, in the method for manufacturing an information recording medium of the present invention, the step of forming the at least one information layer, including the step of forming the transmittance adjusting film, the step of forming the isolation film and the step of forming the recording film, further includes the steps of forming a third dielectric film and forming a second dielectric film;

the step of forming the second dielectric film includes sputtering using a target of a dielectric containing ZnS and SiO$_2$;

the step of forming the third dielectric film is continuously carried out after forming the second dielectric film, also includes sputtering using a target of a dielectric containing an oxide of at one element selected from Si and Al; and an intermediate separation layer that separates the information layer from another information layer on the light incident side, or a cover layer that protects the information layer is continuously formed after carrying out the step of forming the third dielectric film.

In this case, a target that is used to form the third dielectric film is preferably made of SiO$_2$ or Al$_2$O$_3$, or Al$_6$Si$_2$O$_{13}$ (a complex oxide of Al and Si).

Embodiments of the present invention will be described below with reference to the accompanying drawings. The following embodiments are illustrative only and the present invention is not limited to the following embodiments.

Embodiment 1

An example of an information recording medium on or from which information is recorded or reproduced using laser beam is described as Embodiment 1 of the present invention. The information recording medium 1 of the present embodiment including three information layers for information recording and reproduction is a multi-layered optical information recording medium enabling information to be recorded on or reproduced from each information layer by irradiation with energy beam 10 (generally, laser beam) from one side. The laser beam 10 is bluish-violet laser beam of which wavelength is in the vicinity of 405 nm. The information recording medium 1 has a first information layer 12, a second information layer 14 and a third information layer 16 laminated in this order with intermediate separation layers 13 and 15 interposed on a substrate 11. A cover layer 17 is provided in contact with the third information layer. The first information layer 12 is a full reflection type information layer and the second information layer 14 and the third information layer 16 are semi-transmission type information layers. In this information recording medium, the second information layer 14 and the third information layer 16 are ones located on the light incident side and has transmittance such that the laser beam can passes therethrough to record information on another information layer or reproduce from another information layer.

As described above, since information can be recorded on and/or reproduced from three information layers in the information recording medium 1, an information recording medium having a capacity of 100 GB can be obtained when the capacity per information layer is 33.4 GB.

An effective reflectance of each of three information layers may be controlled by adjusting the reflectance of each of the first, second and third information layers and the transmittance of each of the second and third information layers.

In the present specification, the reflectance of each information layer which is determined in the state where three information layers are stacked is determined as the effective reflectance. When the "effective" is not indicated, the reflectance is a reflectance determined without stacking the information layers, unless otherwise noted. Further, Rcg is a groove-portion reflectance of an information layer when the recording layer is in crystal phase and Rag is a groove-portion reflectance of an information layer when the recording layer is in amorphous phase. Here, "groove portion" refers to a portion where a guide groove (which is described below) formed in a substrate and the "groove-portion reflectance" is a reflectance of the information layer located above the region having the groove portion. A "reflectance ratio" is defined as Rcg/Rag. A "reflectance contrast" is defined as (Rcg−Rag)/(Rcg+Rag). Here, assuming that Rc is a mirror-portion reflectance of the information layer when the recording layer is in crystal phase and Rc is a mirror-portion reflectance of the information layer when the recording layer is in amorphous phase, Rc is 1.2 to 1.4 times Rcg, and Ra is 1.2 to 1.4 times Rag. Here, the "mirror portion" refers to a portion of the substrate where the guide groove is not formed (a flat portion).

In this embodiment, a configuration designed such that the first information layer 12 has the effective Rcg of 1.8% and the effective Rag of 0.2%, the second information layer 14 has the effective Rcg of 1.8% and the effective Rag of 0.2% and the third information layer 16 has the effective Rcg of 2.7% and the effective Rag of 0.4%, is described as an example.

When the third information layer 16 has transmittance [(Tc+Ta)/2] of 57% and the second information layer 14 has transmittance of 48%, the above reflectances can be achieved by designing the first information layer 12 such that it has Rcg of 24% and Rag of 3%, designing the second information layer 14 such that it has Rcg of 5.5% and Rag of 0.7% and designing the third information layer 16 such that it has Rcg of 2.7% and Rag of 0.4%. Here, Tc is a transmittance of the information layer when the recording layer is in crystal phase, and Ta is a transmittance of the information layer when the recording layer is in amorphous phase. In an example, when [(Tc+Ta)/2] of the third information layer 16 is 57%, Tc may be 56% and Ta may be 58%. Alternatively, Tc may be 58% and Ta may be 56%. Although Tc and Ta may not be the same, they are preferably close in value.

The functions, materials and thicknesses of the substrate 11, the intermediate separation layer 13, the intermediate separation layer 15 and the cover layer 17 are described below.

The substrate 11 is a transparent substrate of disc shape and serves as a support and protects the information layer. The material for the substrate 11 is, for example, resin such as polycarbonate, amorphous polyolefin or PMMA, or glass. A concavo-convex guide groove for guiding laser beam 10 may be optionally formed in a surface of the substrate 11 on which the information layer is formed. The surface of the substrate 11 opposite to the side on which information layer is formed is preferably flat. It should be noted that the substrate preferably has a thickness of about 1.1 mm and a diameter of about 120 mm in the embodiment illustrated in the drawing. Further, when the guide groove is formed in the substrate 11, the surface which is on the side nearer to the laser beam 10 is called a "groove surface" and the surface which is on the side far from the laser beam 10 is called a "land surface" for convenience in the specification. For example, when the medium 1 is used as a Blu-ray Disc (BD), a difference in level between the groove surface and the land surface (which may be referred to as a "groove depth") is preferably 10 nm or more and 30 nm or less. In the BD, the recording is carried out only on the groove surface. In the substrate 11 for the BD, a distance between two grooves (a distance between two centers of groove surfaces, which may be called as a "track pitch") is preferably about 0.32 µm.

The intermediate separation layers 13 and 15 are formed of a resin such as a light-curing resin (particularly, an ultraviolet-curing resin) or a slow-acting thermosetting resin, or a dielectric. The intermediate separation layers 13 and 15 preferably have small optical absorptance (that is, high transparency) to light having a wavelength λ which is used for recording and reproduction such that the laser beam efficiently reaches the first information layer 12 and the second information layer 14. The intermediate separation layers 13 and 15 are used for discriminating the focal positions of the first information layer 12, the second information layer 14 and the third information layer 16 and the thicknesses thereof are required to be equal to or more than a focal depth ΔZ that is determined by a numerical aperture (NA) of an objective lens and the wavelength λ of the laser beam. Assuming that the standard of the optical intensity at the focus point is 80% of the optical intensity in the case of non aberration, ΔZ can be approximated as $\Delta Z = \lambda/\{2(NA)^2\}$. Further, the intermediate separation layer 13 and the intermediate separation layer 15 preferably differ in thickness in order to avoid the effect of back-side focus in the second information layer 14. Further, a concavo-convex groove guide may be formed on the laser beam incident side in the intermediate separation layers 13 and 15.

The cover layer 17 is provided in order to protect a multi-layered film (particularly, the third information layer 16) of the medium and is formed of, for example, a resin such as a light-curing resin (particularly, an ultraviolet-curing resin) or a slow-acting thermosetting resin, or a dielectric. The cover layer preferably has small optical absorptance (that is, high transparency) to the laser beam to be used. Specifically, the cover layer 17 may be formed using a resin such as polycarbonate, amorphous polyolefin or poly(methyl methacrylate) (PMMA), or glass. When these materials are used, the cover layer 17 may be formed by, for example, a method wherein uncured resin is applied to a surface of a second dielectric film 116 in the third information layer, and then the resin is cured by light (particularly, ultraviolet ray) or heat, or a method wherein a sheet of resin or glass is bonded to the second dielectric film 116 with an adhesive layer. A thickness of the cover layer 17 is preferably about 40 μm to about 80 μm, more preferably about 50 μm to about 65 μm when an objective lens with NA=0.85 (NA is a numerical aperture) is used. When the thickness of the cover layer 17 is within this range, recording and reproduction of information can be performed favorably using the objective lens having such NA.

When the medium 1 is used as the BD, the thicknesses of the intermediate separation layers 13 and 15 and the cover layer 17 are selected such that the total of the thicknesses is 100 μm. For example, the thickness of the intermediate separation layer 13 may be about 25 μm, the thickness of the intermediate separation layer 15 may be about 18 μm and the thickness of the cover layer 17 may be about 57 μm.

Next, the configuration of the first information layer 12 is described. The first information layer 12 is formed by laminating a reflective film 101, a first dielectric film 102, a first interface film 103, a recording film 104, a second interface film 105 and a second dielectric film 106 on a surface of the substrate 11 in this order.

The reflective film 101 has an optical function of increasing quantity of light absorbed by the recording film 104. Further, the reflective film 101 has a thermal function of diffusing heat generated in the recording film 104 such that the recording film 104 is easily made amorphous. Furthermore, the reflective film 101 has a function of protecting the multi-layered film from the environment in which the medium is used.

The materials used for the reflective film 101 are, for example, simple metals having high thermal conductivity, such as Ag, Au, Cu, Al, Pt, Ti and W. Further, an Al alloy wherein Cr, Ni or Ti or the like is added to Al, an Au alloy wherein Cu, Cr or Nd or the like is added to Au, an Ag alloy wherein Cu, Pd, Ga, In or Nd is added to Ag, an Ag alloy wherein Pd, Ti, Ru, Al, Au, Ni, Nd, Ga, Ca, In, Gd or Y or the like is added to Ag—Cu, or an Ag alloy wherein Au or Pd or the like is added to Ag—Nd, an Ag alloy wherein Sn or Ga is added to Ag—In, or an alloy such as Ag—Ga—Sn, Ag—Ga—Y, Ag—Ga—Al, Ag—Zn—Al or Cu—Si may be used as the material for the reflective film 101. In particular, the Ag alloy is preferable as the material for the reflective film 101 since it has a large thermal conductivity. It should be noted that a concentration of additional element(s) is preferably 3 atomic % or less in each alloy.

The thickness of the reflective film 101 is preferably 30 nm or more in order that the heat diffusing function is fully fulfilled. However, when the thickness of the reflective film 101 is 240 nm or more, the heat diffusing function is too large, whereby recording sensitivity may be decreased. Therefore, the thickness of the reflective film 101 is more preferably in a range of 30 nm to 240 nm.

The first dielectric film 102 has a function of adjusting an optical distance to enhance the optical absorptance of the recording film 104, and a function of increasing the rate of change in reflected light amount before and after recording to increase signal amplitude. Further, the first dielectric film 102 has a function of diffusing heat generated in the recording film 104 into the reflective film 101 to cool the recording film 104 rapidly. When the heat diffusing effect of the first dielectric film 102 is excellent, the thermal load on the recording film 104 is reduced, achieving favorable repeated overwriting characteristics.

The materials for the first dielectric film 102 are, for example, oxides such as $SiO_2$, $ZrO_2$, $ZrSiO_4$, $HfO_2$, ZnO, $Cr_2O_3$, $In_2O_3$, $Ga_2O_3$, $Al_2O_3$, $TiO_2$, $Nb_2O_5$, $Y_2O_3$, $Bi_2O_3$, $CeO_2$ and $Dy_2O_3$ and so on, nitrides such as CN, TiN, ZrN, $Si_3N_4$, GeN, AlN, Ge—Si—N, Ge—Cr—N and so on, carbides such as SiC and so on, sulfides such as ZnS and so on, and fluorides such as $LaF_3$, $CeF_3$ and $YF_3$ and so on. Alternatively, the first dielectric film 102 may be formed of a mixture thereof. Specific examples of the mixtures include $ZrO_2$—$Y_2O_3$ (stabilized zirconia or partially-stabilized zirconia), $ZrO_2$—$Cr_2O_3$, $ZrO_2$—$SiO_2$—$Cr_2O_3$, $ZrO_2$—$Y_2O_3$—$Cr_2O_3$, $ZrSiO_4$—$Cr_2O_3$, $ZrO_2$—$SiO_2$—ZnO, $ZrO_2$—$In_2O_3$, $ZrO_2$—$SiO_2$—$In_2O_3$, $ZrO_2$—$Y_2O_3$—$In_2O_3$, $ZrO_2$—$SiO_2$—$In_2O_3$—$Cr_2O_3$, $HfO_2$—$Cr_2O_3$, $HfO_2$—$SiO_2$—$Cr_2O_3$, $ZrO_2$—$Ga_2O_3$, $ZrO_2$—$SiO_2$—$Ga_2O_3$, $ZrO_2$—$SiO_2$—$Ga_2O_3$—$Cr_2O_3$, $ZrO_2$—$Al_2O_3$, $ZrO_2$—$TiO_2$, $SiO_2$—$TiO_2$, $TiO_2$—$Nb_2O_5$, $ZrO_2$—$Nb_2O_5$, $ZrO_2$—$SiO_2$—$Al_2O_3$, $ZrO_2$—$Dy_2O_3$, $ZrO_2$—$SiO_2$—$Dy_2O_3$, $In_2O_3$—$Dy_2O_3$, $Bi_2O_3$—$SiO_2$, $TiO_2$—$CeO_2$, $ZrO_2$—AlN, $Al_2O_3$—AlN, $ZrO_2$—$Cr_2O_3$—SiC, $ZrO_2$—$SiO_2$—ZnS, $SiO_2$—ZnS, $ZrO_2$—$SiO_2$—$LaF_3$, $ZrO_2$—$SiO_2$—$Cr_2O_3$—$LaF_3$, $ZrO_2$—$CeF_3$, $ZrO_2$—$SiO_2$—$CeF_3$, $ZrO_2$—$SiO_2$—$Cr_2O_3$—$CeF_3$, $Dy_2O_3$—$CeF_3$ and $ZrO_2$—$Dy_2O_3$—$CeF_3$ and so on.

The thickness of the first dielectric layer 102 is preferably 2 nm to 50 nm. In order to further increase the rate of changing in reflected light amount, it is more preferably 3 nm to 40 nm.

Here, the composition of the first dielectric film 102 can be analyzed by means of, for example, a X-ray microanalyzer (XMA), an electron probe microanalyzer (EPMA) or a Rutherford back scattering analyzing method (RBS). The first dielectric film 102 formed by sputtering may inevitably contain components coming from rare gases which are present in a sputtering atmosphere (Ar, Kr, Xe), components coming from moisture (O—H), components coming from organic substances (C), components coming from air (N, O), components of jigs provided in a sputtering room (metals), and impurities contained in a sputtering target (metals, semi-metals, semiconductors, dielectric) and these components may be detected by these analyzing methods. These inevitable components may be contained in an amount of up to 10 atomic %, assuming that the total number of atoms contained in the dielectric film is 100 atomic %. Further, when the components except for the inevitable component(s) are the above-mentioned preferable compound or a mixture (that is, made of the compound or the mixture), the first dielectric film 102 functions favorably. This also applies to the dielectric films 106, 113, 118, 119, 123, 128 and 129, the interface layers 103, 105, 114, 117, 124 and 127, the isolation films 110 and 120, and the transmittance adjusting films 111 and 121, which are described below.

The interface layer 103 and the second interface layer 105 function as a barrier for preventing elements from diffusing from the first dielectric film 102 and the second dielectric film 106 to the recording film 104 and preventing outside moisture from mixing into the recording film 104. When the element diffusion from the dielectric film occurs, the crystallization speed of the recording film 103 is lowered to deteriorate the overwriting characteristics, and the crystallization temperature is lowered to deteriorate the storage reliability. For example, when the first dielectric film 106 is formed of a dielectric material containing ZnS (such as $ZnS-SiO_2$), S elements are diffused into the recording film 104 upon recording to lower the crystallization speed, resulting in deterioration of the overwriting characteristics.

Further, since the first interface layer 103 and the second interface layer 105 are provided in contact with the recording layer 104, they also serve to promote or suppress the crystallization of the recording film 104. It is desired that the first interface layer 103 and the second interface layer 105 are excellent in adhesiveness to the recording film 104. These interface layers are preferably formed of materials having small optical absorptivity. The materials for the first interface film 103 and the second interface film 105 include, for example, oxides such as $SiO_2$, $ZrO_2$, $ZrSiO_4$, $HfO_2$, $ZnO$, $Cr_2O_3$, $In_2O_3$, $Ga_2O_3$, $Al_2O_3$, $TiO_2$, $Nb_2O_5$, $Y_2O_2$, $Bi_2O_2$, $CeO_2$ and $Dy_2O_2$ and so on, nitrides such as CN, TiN, ZrN, $Si_2N_4$, GeN, AlN, Ge—Si—N, Ge—Cr—N and so on, carbides such as SiC and so on, sulfides such as ZnS and so on, and fluorides such as $LaF_2$, $CeF_3$ and $YF_3$ and so on. Alternatively, the first interface layer 103 and the second interface layer 105 may be formed of a mixture thereof. Of these materials, an oxide of at least one selected from Si, Zr, Hf, Bi, Cr, In, Ga, Al, Ti, Nb, Y, Zn and Dy is preferably used. The first interface layer 103 and the second interface layer 105 containing such an oxide revels further improved adhesiveness to the recording film 104.

Specifically, the materials for the first interface film 103 and the second interface layer 105 include $ZrO_2-Y_2O_3$ (stabilized zirconia or partially-stabilized zirconia), $ZrO_2-Cr_2O_3$, $ZrO_2-SiO_2-Cr_2O_3$, $ZrO_2-Y_2O_3-Cr_2O_3$, $ZrSiO_4-Cr_2O_3$, $ZrO_2-SiO_2-ZnO$, $ZrO_2-In_2O_3$, $ZrO_2-SiO_2-In_2O_3$, $ZrO_2-Y_2O_3-In_2O_3$, $ZrO_2-SiO_2-In_2O_3-Cr_2O_3$, $HfO_2-Cr_2O_3$, $HfO_2-SiO_2-Cr_2O_3$, $ZrO_2-Ga_2O_3$, $ZrO_2-SiO_2-Ga_2O_3$, $ZrO_2-SiO_2-Ga_2O_3-Cr_2O_3$, $ZrO_2-Al_2O_3$, $ZrO_2-TiO_2$, $SiO_2-TiO_2$, $ZrO_2-Nb_2O_5$, $ZrO_2-SiO_2-Al_2O_3$, $ZrO_2-Dy_2O_3$, $ZrO_2-SiO_2-Dy_2O_3$, $In_2O_3-Dy_2O_3$, $Bi_2O_3-SiO_2$, $TiO_2-CeO_2$, $ZrO_2-AlN$, $Al_2O_3-AlN$, $ZrO_2-SiC$, $ZrO_2-Cr_2O_3-SiC$, $ZrO_2-SiO_2-ZnS$, $SiO_2-ZnS$, $ZrO_2-SiO_2-LaF_3$, $ZrO_2-SiO_2-Cr_2O_3-LaF_3$, $ZrO_2-CeF_3$, $ZrO_2-SiO_2-CeF_3$, $ZrO_2-SiO_2-Cr_2O_3-CeF_3$ and $Dy_2O_3-CeF_3$. The thicknesses of each of the first interface layer 103 and the second interface layer 105 is preferably 1 nm to 12 nm. When the interface layer is too thin, satisfactory effect as a barrier is not given, whereby the diffusion of element and mixing of moisture into the recording film 104 are caused, resulting in deterioration of signal quality. Further, when the thickness is too large, the effect of promoting or suppressing crystallization of the recording film is too large, deteriorating the recording and reproduction characteristics. For this reason, the thickness is more preferably 2 nm to 10 nm.

It should be noted that the first interface film 103 is optionally provided. When the first dielectric film 102 also functions as the first interface film 103, the first interface film 103 needs not necessarily to be provided.

The recording film 104 is made of, for example, a material which causes reversible phase change between the crystal phase and the amorphous phase by irradiation with laser beam. Such materials include, for example, a material that is composed of three elements Te, Bi and Ge, and has a composition located on a line extending between $Ge_{50}Te_{50}$ and $Sb_{40}Te_{60}$ in a ternary diagram, or a composition in the vicinity of the line; a material that has a composition located on a line extending between $Ge_{50}Te_{50}$ and $Bi_{40}Te_{60}$ in a ternary diagram, or a composition in the vicinity of the line; or a material that is composed of Ge, Te and In and has a composition located on a line extending between $Ge_{50}Te_{50}$ and $In_{40}Te_{60}$ in a ternary diagram, or a composition in the vicinity of the line. Further, a material based on any of the above-mentioned material may be used, wherein a fourth element substitutes or is added for adjusting the crystallization ability or the amount of change in light.

The phase change material described above is represented by a compositional formula $Ge_aM1_bM2_cTe_{100-(a+b+c)}$ (atomic %). This material gives a recording film of which amorphous phase is stable, revealing a large amount of change in light between the crystal phase and the amorphous phase. In this formula, M1 is one or more elements selected from Sb, Bi and In, and M2 is one or more elements selected from Si, Ti, V, Fe, Co, Ni, Cu, Zr, Nb, Mo, Se, Ru, Rs, Pd, Mn, Ag, Al, Cr, Sn, Ga, In, Ta, Sb, Dy, Gd, Td, Os, Ir, W, Pt and Au. Preferably "a" satisfies $30 \le a \le 55$, more preferably $37 \le a \le 49$. Further, "b" preferably satisfies $0 < b \le 20$, and more preferably $0 < b \le 12$. Further, "c" preferably satisfies $0 \le c \le 20$, and more preferably $0 < c \le 12$. Further, $35 \le a+b+c \le 60$ is preferably satisfied.

Alternatively, a material represented by a compositional formula $Sb_dTe_eGe_fM3_{(100-d-e-f)}$ (atomic %) may be used as the material for the recording film 104, wherein M3 is at least one element selected from Au, In, Al, Ga, C, Si, Zn, Mn, Sn and Bi. The use of such a material can form the recording film having high crystallization ability. In this formula, d, e and f preferably satisfy $70 \le d \le 90$, $0 \le e \le 25$ and $3 \le f \le 25$.

The thickness of the recording film 104 is preferably in a range of 5 nm to 20 nm in order to achieve favorable recording characteristics. When the recording film 104 is too thick, the thermal effects on adjacent regions due to heat diffusion in an in-plane direction are increased. Further, when the recording film 104 is too thin, the amount of change in reflectance of the information recording medium 1 is reduced. The thickness of the recording film 104 is more preferably 7.5 nm to 13 nm.

In a variation of this embodiment, the recording film 104 may be formed of an irreversible phase change material. For example, an oxide material containing at least one of Te—O, Sb—O, Ge—O, Sn—O, In—O, Zn—O, Mo—O and W—O or an organic dye-based recording material may be used as the irreversible phase change material. Alternatively, the recording film 104 may be formed by laminating two or more layers such that the materials contained in the respective layers are alloyed or reacted upon recording to form an irreversible phase change material. Of these materials, TeO$_x$+M4 (M4 is an element such as Pd, Ge or the like), as disclosed in JP-B-7-25209 (U.S. Pat. No. 2,006,849), is preferably used. When the recording film is made of the irreversible phase change material, the first information layer 12 becomes a write-once information layer in which information can be written only once.

Alternatively, in a still further variation of the present embodiment, the recording film 104 may be formed using a magneto-optical material which enables the recording, erasing and reproduction of information by application of magnetic field and irradiation with light. As the magneto-optical material, a material may be used which contains at least one element selected from a rare-earth metal group consisting of Tb, Gd, Dy, Nd and Sm, and at least one element selected from a transition metal group consisting of Sc, Cr, Fe, Co and Ni. Specifically, the magneto-optical materials include, for example, Tb—Fe, Te—Fe—Co, Gd—Fe, Gd—Fe—Co, Dy—Fe—Co, Nd—Fe—Co, Sm—Co, Tb—Fe—Ni, Gd—Tb—Fe—Co and Dy—Sc—Fe—Co and so on. The configuration of information recording medium wherein the recording film 104 is formed of the magneto-optical material is not necessarily the same as that shown in FIG. 1, but the interface films provided on both sides of the recording film are preferably formed using the constitution and the material as described above.

The composition of the recording film 104 can be analyzed by means of, for example, inductive coupling plasma (ICP) emission spectroscopy analysis, a X-ray microanalyzer (XMA), or an electron probe microanalyzer (EPMA), irrespective of the kinds of the recording film. The recording film 35 formed by sputtering may inevitably contain components coming from rare gases which are present in a sputtering atmosphere (Ar, Kr, Xe), components coming from moisture (O—H), components coming from organic substances (C), components coming from air (N, O), components of jigs provided in a sputtering room (metals), and impurities contained in a sputtering target (metals, semi-metals, semiconductors, dielectric) and these components may be detected by analysis such as ICP emission spectroscopy analysis, XMA and EPMA and so on. These inevitable components may be contained in an amount of up to 10 atomic %, assuming that the total number of atoms contained in the recording film 104 is 100 atomic %. Further, when the components except for the inevitable component(s) satisfies the above-mentioned formula (that is, when the recording film 104 is substantially made of a material represented by such a formula), the recording film 104 functions favorably. This also applies to the recording films 116 and 126, which are described below.

The second dielectric film 106 has a function of protecting the recording film 104 from moisture and so on. Further, it has a function of adjusting the optical distance to enhancing optical absorptivity of the recording film 104, and a function of increasing the rate of change in reflected light amount before and after recording, similarly to the first dielectric film 102. The second dielectric film 106 may be formed using, for example, an oxide such as $ZrO_2$, $HfO_2$, $SiO_2$, MgO, ZnO, $TiO_2$, $Nb_2O_2$, $Ta_2O_5$ and $Al_2O_3$, a nitride such as CN, TiN, ZrN, $Si_3N_4$, GeN, AlN, Ge—Si—N and Ge—Cr—N, and a sulfide such as ZnS and a carbide such as SiC. Of these materials, a mixture of ZnS and $SiO_2$ is particularly excellent as the material for the second dielectric film 106 since it is an amorphous material, revels a high film-formation speed, has a high refractive index, and is excellent in mechanical strength and moisture resistance.

The thickness of the second dielectric film 106 is determined by, for example, a matrix method (for example, see "Wave Optics" by Hiroshi Kubota et al., Section 3, Iwanami Shoten, 1971). The thickness may be determined such that a large rate of change in reflected light amount is observed between the case wherein the recording film 15 is in crystal phase and the case wherein the recording film 15 is in amorphous phase, and the optical absorptivity of the recording film 15 is large. Specifically, the thickness of the second dielectric film 106 is preferably in a range of 20 nm to 150 nm, and more preferably in a range of 40 nm to 90 nm.

Next, the configuration of the second information layer 14 is described. The second information layer 14 is formed by laminating an isolation film 110, a transmittance adjusting film 111, a reflective film 112, a first dielectric film 113, a first interface film 114, a nucleation film 115, a recording film 116, a second interface film 117, a second dielectric film 118 and a third dielectric film 119 on a surface of an intermediate separation layer 13 in this order.

The isolation film 110 is an element which characterizes the present invention. The isolation film 110 is formed such that the transmittance of the second information layer 14, which is improved by the transmittance adjusting film 111, is reduced as little as possible due to the formation of the isolation film 111. This isolation film 110 can suppress the effect on the repeated overwriting characteristics, which is considered to be caused by the direct contact of the intermediate separation layer 13 with the transmittance adjusting film 11.

The isolation film 110 is formed such that its refractive index and extinction coefficient of an optical constant at a wavelength of 405 nm are close to those of the intermediate separation layer 13. Specifically, isolation film 110 has the refractive index of 1.8 or less, and the extinction coefficient of 0.05 or less, at the wavelength of 405 nm. Such optical constant of the isolation film 110 can suppress the reduction in transmittance of the second information layer 14 even if the isolation film 110 is formed, resulting in the above-mentioned effects. A lower limit of the refractive index of the optical constant of the isolation film 110 is not limited to a particular one, as long as it is 1.8 or less. However, the lower limit is generally about 1.4 considering that a film having such refractive index is formed as a thin film (for example, having a thickness of 20 nm or less) by a sputtering method or the like. A lower limit of the extinction coefficient of the isolation film 110 is not particularly limited as long as it is 0.05 or less, and it may be 0 or close to 0.

The materials having such optical constant include, for example, Si—O, Al—O, Mg—O, Al—Si—O, Mg—Si—O, La—F, Ce—F and so on. Here a symbol "—" means a "mixture." For example, Si—O is a material from which Si and O are detected when being analyzed at the element level. These materials generally constitute the isolation film 110 in a form of compound such as an oxide, a complex oxide, or a fluoride. The compound may, however, not exist as one of stoichiometric composition.

The isolation film 110 preferably contains a material represented by any of the following formulas, and more preferably consists substantially of such material:

$SiO_x$ (1), wherein x satisfies $1 \leq x \leq 4$;

$AlO_y$ (2), wherein y satisfies $1 \leq Y \leq 4$;

$MgO_z$ (3), wherein z satisfies $1 \leq z \leq 4$;

$AlSi_mO_x$ (4), wherein m satisfies $0.5 \leq m \leq 10$, and n satisfies $1 \leq n \leq 25$;

$MgSi_qO_r$ (5), wherein q satisfies $0.5 \leq q \leq 10$ and r satisfies $1 \leq r \leq 25$;

$LaF_s$ (6), wherein s satisfies $1 \leq s \leq 6$; and $CeF_t$ (7), wherein t satisfies $1 \leq t \leq 6$.

Alternatively, the isolation film 110 may contain, a compound of stoichiometric composition, specifically, $SiO_2$, $Al_2O_3$, $Al_6Si_2O_{13}$ (a complex oxide of Al and Si), MgO, $MgSiO_3$ (a complex oxide of Si and Mg), $LaF_3$ or $CeF_3$, and more preferably consists substantially of such a material. The film containing such a material is formed by a sputtering method as described below. A composition which is determined by analyzing a film formed by the sputtering method may not be of stoichiometric composition. Considering this, the preferable composition of the material contained in the isolation film 110 is shown above using the formulas (1) to (7).

Alternatively, the isolation film 110 may be formed of a mixture of two or more materials selected from the materials represented by the formulas (1) to (7) and the above-mentioned compounds of stoichiometric composition. For example, the isolation film may be formed of a material wherein $SiO_2$ and $Al_2O_2$ are mixed with a molar ratio of 20:1 to 1:20 ($SiO_2$:$Al_2O_2$). Alternatively, the isolation film 110 may contain one or more materials selected from the materials represented by the formulas (1) to (7) and the above-mentioned compounds of stoichiometric composition as a main component (specifically, in an amount of more than 50 mol %) and another oxide, another complex oxide and/or another fluoride as a subcomponent. Such a mixture is preferably a mixture of which base is Si—O or Al—O, more preferably a material represented by the formula (1) or (2), and still more preferably $SiO_2$ or $Al_2O_2$. The kind of subcomponent is not particularly limited as long as the refractive index and the extinction coefficient of the optical constant of the entire isolation film are 1.8 or less and 0.05 or less, respectively.

In order to achieve higher moisture resistance (specifically the moisture resistance equivalent to that of a medium without isolation film), the isolation film 110 preferably contains an oxide of at least one element selected from Si and Al, and preferably consists substantially of such an oxide. Further, it is preferable that the isolation film 110 consists substantially of $SiO_2$ or $Al_2O_3$ in order to avoid the substantial decrease in transmittance of the second information layer 14. It is considered that these materials adhere to the transmittance adjusting film well and thus do not decrease the moisture resistance of the medium.

The thickness of the isolation film 110 is preferably 3 nm or more and 20 nm or less. When the isolation film is less than 3 nm, the effect given by the formation of the isolation film 110 is not easy to achieve. When the thickness exceeds 20 nm, the formation of the isolation film 110 requires time, resulting in decrease in productivity. Further, when the isolation film 110 is too large, the heat generated during the recording of signals is difficult to diffuse, whereby the repeated overwriting characteristics may be lowered.

The transmittance adjusting film 111 has a function of adjusting the transmittance of the second information layer 14. The formation of this layer enhances both of Tc (%) which is a transmittance of the second information layer 14 when the recording film is in crystal phase, and Ta (%) which is a transmittance of the second information layer 14 when the recording film is in amorphous phase. Specifically, in the case where the transmittance adjusting film 111 is provided, Tc and Ta can be enhanced by 2% to 8% relative to case wherein the transmittance adjusting film 111 is not present. Further, the transmittance adjusting film 111 has a function of diffusing heat generated in the recording film 116 rapidly toward the reflective film 112 to cool the recording film 116.

The refractive index n1 and the extinction coefficient k1 of the transmittance adjusting film 111 preferably satisfy $n1 \leq 2.5$ and $k1 \leq 0.05$ in order to enhance the transmittance. The materials satisfying these conditions include dielectrics containing oxides of Bi and Ti. Specifically, the transmittance adjusting film 111 preferably consists of a dielectric which contains Bi—Ti—O, more preferably a material represented by $(Bi_2O_2)_g(TiO_2)_{100-g}$ (mol %) wherein $20 \leq g \leq 80$. It is further preferable that the transmittance adjusting film consists essentially of the material represented by this formula. The materials represented by this formula include $Bi_4Ti_3O_{12}$ (g=40), $Bi_2TiO_5$ (g=50), and $Bi_2Ti_2O_7$ (g=33.3).

The thickness of the transmittance adjusting film 111 is selected such that both of the transmittance and the reflectance contrast (Rcg−Rag)/(Rcg+Rag) of the second information layer are high. Specifically, the thickness of the transmittance adjusting film is preferably 10 nm or more and 30 nm or less.

The reflective film 112 may be formed using the same material as that for the reflective film 101 described above. The functions of the reflective film 112 are the same as those of the reflective film 101. The thickness of the reflective film 112 is preferably in a range of 4 nm to 20 nm, more preferably a range of 7 nm to 14 nm, in order to ensure the transmittance in the second information layer 14.

The first dielectric film 113 may be formed using the same material as that for the first dielectric film 102 described above. The functions of the first dielectric film 113 are the same as those of the first dielectric film 102. The thickness of the first dielectric film 113 is preferably in a range of 3 nm to 20 nm, more preferably in a range of 4 nm to 15 nm.

The first interface film 114 may be formed using the same material as that for the first interface film 103 described above. The functions of the first interface film 114 are the same as those of the first interface film 103. The thickness of the first interface film 114 is preferably in a range of 3 nm to 15 nm and more preferably in a range of 3 nm to 10 nm.

The first interface film 114 may be optionally provided. The first interface film 103 needs not necessarily to be provided if the first dielectric film 113 also functions as the first interface film 114.

The nucleation film 115 is in contact with the recording film 116 and thereby has a function of reducing a crystal diameter in the recording film 116. When the crystal diameter of the recording film 116 is reduced, noise of the information layer can be reduced, resulting in improvement of signal quality. The materials for the nucleation film 15 include materials represented by a formula $(Ge_{0.5}Te_{0.5})_h(Bi_{0.4}Te_{0.6})_{100-h}$ (atomic %) wherein $0 < h \leq 90$, a formula $(Ge_{0.5}Te_{0.5})_i(Sb_{0.4}Te_{0.6})_{100-i}$ (atomic %) wherein $0 < i \leq 80$, and a formula $(Ge_{0.5}Te_{0.5})_j(Sn_{0.5}Te_{0.5})_{100-j}$ (atomic %) wherein $0 < j \leq 60$. The nucleation film 115 is formed such that it has a thickness sufficient to fulfill its function of reducing the crystal diameter of the recording layer 116. Specifically, the thickness is preferably 0.1 nm or more and 2.0 nm or less, more preferably 0.5 nm or more and 1.2 nm or less.

The composition of the nucleation film 115 can be analyzed by means of, for example, ICP emission spectroscopy analysis, XMA, or EPMA. The nucleation film 116 formed by sputtering may inevitably contain components coming from rare gases which are present in sputtering atmosphere (Ar, Kr, Xe), components coming from moisture (O—H), components coming from organic substances (C), components coming from air (N, O), components of jigs provided in a sputtering room (metals), and impurities contained in a sputtering target (metals, semi-metals, semiconductors, dielectric) and these components may be detected by analysis such as ICP emission spectroscopy analysis, XMA and EPMA and so on. These inevitable components may be contained in an amount of up to 10 atomic %, assuming that the total number of atoms contained in the nucleation film 116 is 100 atomic %. Further, when the components except for the inevitable component(s) satisfy the above-mentioned formula (that is, when the nucleation film 115 consists substantially of a material represented by such a formula), the nucleation film 115 functions favorably. This also applies to the nucleation film 126, which is described below.

The recording film 116 may be formed using the reversible phase-change material described in connection with the above-mentioned recording film 104. The functions of the recording film 116 are the same as those of the recording film 114 which is formed as a reversible phase-change film. The thickness of the recording film 116 is preferably small so as to increase the transmittance to the laser beam. Specifically, the thickness is more preferably in a range of 4 nm to 10 nm.

The recording film 116 of the second information layer 14 preferably contains a material represented by $Ge_aM1_bM2_cTe_{100-(a+b+c)}$ (atomic %). It is more preferable that the film 116 consists substantially of such material. The material preferably contains $Ge_{50}Te_{50}$ in a larger amount in order that an amount of optical change is increased to enhance reflectance contrast in the information recording medium such that larger signal amplitude is obtained even if the thickness is small.

The second interface film 117 may be formed using the same material as that for the second interface film 105 described above. The functions of the second interface film 117 are the same as those of the second interface film 105. The thickness of the second interface film 117 is preferably in a range of 2 nm to 12 nm, more preferably in a range of 3 nm to 8 nm.

The second dielectric film 118 may be formed using the same material as that for the second dielectric film 106 described above. The functions of the second dielectric film 118 are the same as those of the second dielectric film 106. The thickness of the second dielectric film 118 is preferably in a range of 20 nm to 100 nm, more preferably in a range of 25 nm to 60 nm.

The third dielectric film 119 is disposed between the second dielectric film 118 and the intermediate layer 16 which separates the second information layer from another information layer on the light incident side (the third information layer 16). The third dielectric film 119 has a function of diffusing heat generated in the recording film 116 rapidly to reduce thermal load to the recording film. The third dielectric film 119 is preferably provided since the second dielectric film 118 is relatively thick and therefore heat tends to be stored in the second dielectric film. The thermal conductivity of the third dielectric film is preferably higher than that of the second dielectric film 118. Further, as described above, $ZnO$—$SiO_2$ is extremely suitable as a material for the second dielectric film 118 and is used widely. $ZnO$—$SiO_2$ is, however, a material of which thermal conductivity is low among dielectric materials. Thus, the effect given by the third dielectric film 119 appears remarkably when the second dielectric film 118 is formed of $ZnO$—$SiO_2$.

Further, the third dielectric film 119 is preferably formed of a material of which a refractive index and an extinction coefficient of an optical constant at a wavelength of 405 nm are close to those of the intermediate separation layer 15, in order to reduce the decrease in transmittance of the second information layer 14. Specifically, the material for the third dielectric film 119 is required to have the refractive index of 1.8 or less and the extinction coefficient of 0.05 or less. Such material is the material for the isolation film 111 described above. Si—O, Al—O, Mg—O, Al—Si—O, Mg—Si—O, La—F and Ce—F have thermal conductivity higher than that of ZnS—$SiO_2$, and have the refractive index and the extinction coefficient within the above mentioned ranges. The material for the third dielectric film 119 may be a material represented by formulas (1) to (7) or a compound of stoichiometric composition. Alternatively, the material may be a mixture containing such material or such compound. Further, the third dielectric film 119 is preferably formed of an oxide of at least one element selected from Si and Al (particularly $SiO_2$ and $Al_2O_3$) from the viewpoints of moisture resistance, similarly to the isolation film 110. A thickness of the third dielectric film 119 is preferably 5 nm or more and 20 nm or less.

Next, the configuration of the third information layer 16 is described. The third information layer 16 is formed by laminating an isolation film 120, a transmittance adjusting film 121, a reflective film 122, a first dielectric film 123, a first interface film 124, a nucleation film 125, a recording film 126, a second interface film 127, a second dielectric film 128, and a third dielectric film 129 on the surface of the intermediate separation layer 115, in this order. The configuration of the third information layer 16 is basically the same as that of the second information layer 14. Therefore, the material, functions and shape of each layer constituting the third information layer 16 are the same as those of each layer in the second information layer 14.

Specifically, the isolation film 120 may be formed using the same material as that for the isolation film 110. The functions and the shape of the isolation film 120 are the same as those of the isolation film 110. The isolation film 120 is disposed between and adjacent to the transmittance adjusting film 121 and the intermediate layer 15 which separates the third information layer 16 from the second information layer.

The transmittance adjusting film 121 may be formed using the same material as that for the transmittance adjusting film 111. The functions and the shape of the transmittance adjusting film 111 are the same as those of the transmittance adjusting film 111.

The reflective film 122 may be formed using the same material as that for the reflective film 112. The functions of the reflective film 122 are the same as those of the reflective film 112. The thickness of the reflective film 122 is preferably small in order to enhance the transmittance of the third information layer 16. Specifically, the thickness is more preferably in a range of 5 nm to 12 nm.

The first dielectric film 123 may be formed using the same material as that for the first dielectric film 113. The functions and the shape of the first dielectric film 123 are the same as those of the first dielectric film 113.

The first interface film 124 may be formed using the same material as that for the first interface film 114. The functions and the shape of the first interface film 124 are the same as those of the first interface film 114. It should be noted that the first interface film 124 may be optionally provided when elements diffuse from the first dielectric 123 into the nucleation film 125 and/or the recording layer 126.

The nucleation film 125 may be formed using the same material for the nucleation film 115. The functions and the shape of the nucleation film 125 are the same as those of the nucleation film 115.

The recording film 126 may be formed using the same material (reversible phase-change material) as that for the recording film 116. The functions of the recording film 126 are the same as those of the recording film 116. The thickness of the recording film 116 is preferably small in order to enhance the transmittance of the third information layer 16. Specifically, the thickness is more preferably in a range of 3 nm to 8 nm. Further, the recording film 126 preferably contains a material represented by $Ge_aM1_bM2_cTe_{100-(a+b+c)}$ (atomic %) and more preferably consists substantially of such material, similarly to the recording film 116. The material preferably contains $Ge_{50}Te_{50}$ in a larger amount in order that an amount of optical change is increased to enhance reflectance contrast in the information recording medium such that larger signal amplitude is obtained even if the thickness is small.

The second interface film 127 may be formed using the same material as that for the second interface film 117. The functions and the shape of the second interface film 127 are the same as those of the second interface film 117.

The second dielectric film 128 may be formed using the same material as that for the second dielectric film 118. The functions and the shape of the second dielectric film 128 are the same as those of the second dielectric film 118.

The third dielectric film 129 may be formed using the same material as that for the third dielectric film 119. The functions and the shape of the third dielectric film 129 are the same as those of the third dielectric film 119. Since the cover layer 17 is formed on the surface of the third information layer 16, the third dielectric film 129 is disposed between the second dielectric film 128 and the cover layer 17.

In another embodiment of the information recording medium having three information layers, any one of the information layers may be of read-only type. The read-only type information layer has a reflective film which is formed on recording pits which have been previously formed in a substrate (or an intermediate layer). The reflective film is formed using a material containing at least one selected from a group consisting of metal elements, metal alloys, dielectrics, dielectric compounds, semiconductor elements, and semi-metal elements. For example, the reflective film may be a layer containing Ag or an Ag alloy.

In a still further embodiment, the information recording medium may include 4 or more information layers. The effect of the present invention is given in any embodiment including three or more information layers, as long as at least one information layer disposed on the light incident side is a rewritable information layer and contains a transmittance adjusting film containing an oxide of Bi and Ti, and an isolation film having an optical constant such that a refractive index of 1.8 or less and an extinction coefficient of 0.05 or less, and the isolation film is disposed between and adjacent to the transmittance adjusting film and an intermediate separation layer which separates this information layer from another information layer on the side opposite to the light incident side.

Information can be recorded in the information recording media of the present invention including the information recording medium 1 of Embodiment 1, according to either the Constant Linear Velocity (CLV) recording mode or the Constant Angular Velocity (CAV) recording mode.

The recording and reproduction of information for the information recording medium of the present invention including the information recording medium 1 of Embodiment 1 are preferably carried out using an optical system wherein a numerical aperture NA of an objective lens is 0.85. However, NA is not limited to this and the recording and reproduction may be carried out using the optical system with NA>1. Solid Immersion Lens (SIL) and Solid Immersion Mirror (SIM) may be used as the optical system with NA>1. When such an optical system is used, the intermediate separation layer and the cover layer may be formed into layers having thicknesses of 5 μm or less, respectively. Alternatively, the recording and reproduction of the information may be carried our using an optical system which uses near-field light.

Next, a method for manufacturing the information recording medium 1 of Embodiment 1 is described. A reflective film, a first dielectric film, a first interface film, a recording film, a second interface film, a second dielectric film and a transmittance adjusting film may be formed using a sputtering method which is one of gas-phase film formation methods. Firstly, a substrate 11 (for example, having a thickness of 1.1 mm) is placed within a film-formation apparatus.

Subsequently, the reflective film 101 is formed firstly. The reflective film 101 is formed on a guide-groove side when the guide groove is formed on the substrate 11. The reflective film 101 can be formed by sputtering a target of a metal or an alloy, which is to constitute the reflective film 101, in a rare-gas atmosphere or a mixed-gas atmosphere of a rare gas and a reactive gas (for example, an oxygen gas or a nitrogen gas). The rare gas may be any one of an Ar gas, a Kr gas and a Xe gas. Among these, the Ar gas is economical and thus preferably used as the rare gas. This is applicable to the rare gas which is mentioned below.

Next, the first dielectric film 102 is formed on the reflective film 101. The first dielectric film 102 can be formed by sputtering a sputtering target containing a dielectric (compound or mixture), which is to constitute the first dielectric film 102, in a rare-gas atmosphere or a mixed-gas atmosphere of a rare gas and a reactive gas. The sputtering conducted in the mixed gas atmosphere of the rare gas and the reactive gas may be a reactive sputtering for forming the dielectric constituting the dielectric film 102. In this case, the sputtering target may consist of a metal element. In the reactive sputtering, the metal element reacts with an element contained in the mixed gas to give the dielectric (for example, an oxide or a nitride).

Subsequently, the first interface film 103 is formed on the first dielectric film 102. The first interface film 103 can be formed by sputtering a target of a dielectric (compound or mixture) which is to constitute the first interface film 103, in a rare-gas atmosphere or a mixed-gas atmosphere of a rare gas and a reactive gas. The sputtering conducted in the mixed gas atmosphere of the rare gas and the reactive gas may be a reactive sputtering during which the dielectric constituting the first interface film 103 is formed. In this case, the sputtering target may consist of a metal element.

Next, the recording film 104 is formed on the first interface film 103. The recording film 104 can be formed by sputtering a target of a Ge-M1-M2-Te alloy or a Sb—Te—Ge-M3 alloy in an Ar gas atmosphere, a Kr gas atmosphere or a mixed-gas atmosphere of Ar and a reactive gas or a mixed-gas atmosphere of Kr and a reactive gas, depending on the composition thereof.

Subsequently, the second interface film 105 is formed on the recording film 104. The second interface film 105 can be formed by carrying out sputtering in a rare-gas atmosphere or a mixed-gas atmosphere of a rare gas and a reactive gas, with use of a target of a dielectric (compound or mixture) which is to constitute the second interface film 105. The sputtering conducted in the mixed-gas atmosphere of the rare gas and the reactive gas may be a reactive sputtering during which the dielectric constituting the second interface film 105 is formed. In this case, the sputtering target may consist of a metal element.

Next, the second dielectric film 106 is formed on the second interface film 105. The second dielectric film 106 may be formed by sputtering a target of a dielectric (compound or mixture) which is to constitute the second dielectric film 106, in a rare gas atmosphere and a mixed gas atmosphere of a rare gas and a reactive gas. The sputtering in the mixed gas atmosphere of the rare gas and the reactive gas may be a reactive sputtering during which the dielectric constituting the second dielectric film 106 is formed. In this case, the sputtering target may consist of a metal element.

Subsequently, the intermediate separation layer 13 is formed on the second dielectric film 106. The intermediate separation layer 13 may be formed by applying a resin such as a light curing resin (particularly, a ultraviolet curing resin) or a slow-acting thermosetting resin to the first information layer 301 by means of a spin coating method, followed by curing the resin. It should be noted, when a guide-groove is formed in the intermediate separation layer 31, a plate (mold) for transfer wherein a groove of predetermined shape is formed in a surface thereof is brought into contact with an uncured resin, then the substrate and the plate for transfer are rotated such that the uncured resin is spread by the spin coating method, and then the resin is cured. Further, the plate for transfer is removed from the cured resin, to complete intermediate isolation layer 13 with the predetermined guide groove formed therein.

Next, the second information layer 14 is formed. The formation of the second information layer 14 is started with the formation of the isolation film 110. The isolation film 110 can be formed by sputtering a target of a dielectric (compound or mixture) which is to constitute the isolation film 110 in an Ar gas atmosphere or a mixed-gas atmosphere of Ar and a reactive gas. The sputtering conducted in the mixed-gas atmosphere of Ar and reactive gas may be a reactive sputtering. In this case, the target may consist of a metal element.

Subsequently, the transmittance adjusting film 111 is formed. The transmittance adjusting film 111 can be formed by carrying out sputtering in an Ar gas atmosphere, or a mixed gas of Ar and a reactive gas, with use of a sputtering target of a dielectric (compound or mixture) which is to constitute the transmittance adjusting film 111. The sputtering conducted in the mixed-gas atmosphere of Ar and the reactive gas may be a reactive sputtering. In this case, the target may consist of a metal element.

Subsequently, the reflective film 112 is formed on the transmittance adjusting film 111. The reflective film 112 can be formed by the same method as that for the reflective film 101 described above.

Next, the first dielectric film 113 is formed on the reflective film 112. The first dielectric film 113 can be formed by the same method as that for the first dielectric film 102 described above.

Subsequently, the first interface film 114 is formed on the first dielectric film 113. The first interface film 114 can be formed by the same method as that for the first interface film 103.

Next, the nucleation film 115 is formed on the first interface film 114. The nucleation film 115 can be formed by sputtering a target of a Ge—Bi—Te alloy, a Ge—Sb—Te alloy, or a Ge—Sn—Te alloy depending on the composition, in an Ar gas atmosphere, a Kr gas atmosphere, a mixed gas atmosphere of Ar and a reactive gas or a mixed gas atmosphere of Kr and a reactive gas.

Subsequently, the recording film 116 is formed on the nucleation film 115. The recording film 116 can be formed by the same method as that for the recording film 104 described above.

Next, the second interface film 117 is formed on the recording film 116. The second interface film 117 can be formed by the same method as that for the second interface film 105 described above.

Next, the second dielectric film 118 is formed on the second interface film 117. The second dielectric film 118 can be formed by the same method as that for the second dielectric film 116 described above.

Subsequently, the third dielectric film 119 is formed on the second dielectric film 118. The third dielectric film 119 can be formed by sputtering a target of a dielectric (compound or mixture) which is to constitute the third dielectric film 119, in an Ar gas atmosphere, a mixed-gas atmosphere of Ar and a reactive gas. The sputtering carried out in the mixed-gas atmosphere may be a reactive sputtering. In this case, the target may consist of a metal element.

Next, the interface separation layer 15 is formed on the third dielectric film 119. The interface separation film 15 can be formed by the same method as that for the intermediate separation layer 13 described above.

Subsequently, the third information layer 16 is formed. The third information layer 16 is basically formed by the same method as that for the second information layer 14 described above.

Firstly, the isolation film 120 is formed on the intermediate separation layer 15. The isolation film 120 can be formed by the same method as that for the isolation film 110 described above.

Next, the transmittance adjusting film 121 is formed on the isolation film 120. The transmittance adjusting film 120 can be formed by the same method as that for the transmittance adjusting film 111 described above.

Subsequently, the reflective film 122 is formed on the transmittance adjusting film 121. The reflective film 122 can be formed by the same method as that for the reflective film 112.

Next, the first dielectric film 123 is formed on the reflective film 122. The first dielectric film 123 can be formed by the same method as that for the first dielectric film 113 described above.

Subsequently, the first interface film 124 is formed on the first dielectric film 123. The first interface film 124 can be formed by the same method as that for the first interface film 114 described above.

Next, the nucleation film 125 is formed on the first interface film 124. The nucleation film 125 can be formed by the same method as that for the nucleation film 124 described above.

Subsequently, the recording film 126 is formed on the nucleation film 125. The recording film 126 can be formed by the same method as that for the recording film 116 described above.

Next, the second interface film 127 is formed on the recording film 126. The second interface film 127 can be formed by the same method as that for the second interface film 117 described above.

Subsequently, the second dielectric film 128 is formed on the second interface film 127. The second dielectric film 128 can be formed by the same method as that for the second dielectric film 118 described above.

Next, the third dielectric film 129 is formed on the second dielectric film 128. The third dielectric film 129 can be formed by the same method as that for the second dielectric film 119.

An electric power supply is either a Direct Current (DC) power supply or a Radio Frequency (RF) power supply. An electric power may be 1 W to 10 kW in any case. The sputtering carried out using a DC power supply is referred to as "DC sputtering" and the sputtering carried out using a RF power supply is referred to as "RF sputtering." Further, a pressure in a film-formation room during the sputtering is preferably 0.01 Pa to 50 Pa.

Finally, the cover layer 17 is formed on the third dielectric film 129. The cover layer 17 can be formed by applying and spin-coating a light-curing resin (particularly, a ultraviolet-curing resin) or a slow-acting thermosetting resin to the third dielectric film 129, followed by curing the resin. The cover layer 17 may be formed using a disc-shaped plate of a resin such as polycarbonate, amorphous polyolefin, or poly(methyl methacrylate) (PMMA), or glass. In this case, the cover layer can be formed by applying the light-curing resin (particularly, the ultraviolet-curing resin) or the slow-acting thermosetting resin to the third dielectric film 129, bringing the plate into contact with the resin, spreading the resin uniformly by spin coating, and then curing the resin.

The time for forming each film in each information layer is preferably 18 seconds or less, in order to increase the productivity of the information recording medium and reduce the production cost.

The method for manufacturing the information recording medium 1 by forming the information layers sequentially on the surface of the substrate 11 where the guide groove is formed, is described above. In another manufacturing method, the third information layer 16, the intermediate separation layer 15, the second information layer 14, the intermediate separation layer 13 and the first information layer 12 are formed in this order, and the substrate 11 is finally bonded, completing the information recording medium 1. In this case, the isolation films 120 and 110 are formed continuously after the transmittance adjusting films 121 and 11 are formed, respectively, and the intermediate separation layers 15 and 13 are formed continuously after the isolation films 120 and 110. The third dielectric film 129 is formed on the surface of the cover layer 17 and the third dielectric film 119 is formed continuously after the intermediate separation layer 15 is formed. In a still further manufacturing method, a laminate wherein the third information layer 16 is formed on the surface of the cover layer 17 and a laminate wherein the first information layer 12, the intermediate separation 13 and the second information layer 14 are laminated on the surface of the substrate 11 may be bonded to the intermediate separation layer 15 as an adhesive layer, to complete the information recording medium 1.

The sputtering method is used for forming each layer. The film-formation method is not limited to this. For example, a vacuum deposition method, an ion plating method, a chemical vapor phase deposition (CVD) method, or a molecular beam epitaxy (MBE) method may be used to form each layer.

An initialization step may be optionally carried out, wherein the whole area of the recording film is crystallized. The initialization step for the recording film 104 may be carried out after the second dielectric film 106 or the intermediate separation layer 13 is formed. The initialization step for the recording film 116 may be carried out after the third dielectric film 119 or the intermediate separation layer 15 is formed. The initialization step for the recording film 126 may be carried our after the third dielectric film 129 or the cover layer 17 is formed. Alternatively, all the recording films may be initialized after the cover layer 17 is formed. This initialization step can be carried our by irradiation with laser beam. The wavelength of the laser beam used for the initialization is preferably 790 nm to 830 nm so that the beam width is broadened to shorten the time required for initialization and thereby the production cost is reduced.

In this manner, the information recording medium 1 of Embodiment 1 can be produced.

EXAMPLES

The present invention will be described in detail below by way of Examples.

Example 1

In the present example, an example of an information recording medium 1 shown in FIG. 1 will be described. A method for manufacturing an information recording medium 1 of the present example will be described below.

First, a polycarbonate substrate (having a thickness of 1.1 mm and a diameter of 120 mm) with a guide groove (having a depth of 20 nm and a track pitch of 0.32 μm) formed therein was prepared as a substrate 11. On a surface of the substrate 11 with the guide groove formed thereon, a 100 nm thick Ag—Ga—Cu (containing 96% by weight or more of Ag) film serving as a reflective film 101, a 10 nm thick $(Bi_2O_3)_{40}(TiO_2)_{60}$ (mol %) film serving as a first dielectric film 102, a 5 nm thick $(ZrO_2)_{35}(SiO_2)_{35}(Cr_2O_3)_{30}$ (mol %) film serving as a first interface film 103, a 10 nm thick $Ge_{44.7}In_{4.0}Sb_{0.5}Te_{50.8}$ (atomic %) film serving as a recording film 104, that is made of a material prepared by mixing 0.5 atomic % Sb in a mixture of GeTe and $In_2Te_3$ in a mixing ratio of 22:1, a 3 nm thick layer represented by the composition formula: $(ZrO_2)_{35}(SiO_2)_{35}(Cr_2O_3)_{30}$ (mol %) serving as a second interface film 105, and a $(ZnS)_{80}(SiO_2)_{20}$ (mol %) film serving as a second dielectric film 106 were sequentially formed by the sputtering method. The thickness of the second dielectric film 106 was determined by calculation based on the matrix method. Specifically, the thickness was determined so that when a laser beam with a wavelength of 405 nm was applied, the first information layer 12 had Rcg (reflectance when the recording film 104 is in a crystal phase) of 22% to 25% provided that the second information layer 14 and the third information layer 16 were not included.

Subsequently, an intermediate separation layer 13 (having a thickness of 25 μm) with a guide groove formed therein was formed on the first information layer 12, and a second information layer 14 was formed on the intermediate separation layer 13. The second information layer 14 was formed by sequentially forming a 7 nm thick $SiO_2$ layer serving as an isolation film 110, a 18 nm thick $(Bi_2O_3)_{40}(TiO_2)_{60}$ (mol %) serving as a transmittance adjusting film 111, a 10 nm thick Ag—Pd—Cu (containing 96% by weight or more of Ag) film serving as a reflective film 112, a 8 nm thick $(ZrO_2)_{40}(SiO_2)_{40}(Cr_2O_3)_{20}$ film serving as a first dielectric film 113, a 3 nm thick $(ZrO_2)_{25}(SiO_2)_{25}(Cr_2O_3)_{50}$ (mol %) film serving as a first interface film 114, a 0.7 nm thick $Ge_{14.3}Bi_{28.6}Te_{57.1}$ (atomic % mol %) film serving as a nucleation film 115, a 7.5 nm thick $Ge_{46.0}In_{3.0}Sb_{0.5}Te_{50.5}$ (atomic %) film serving as a recording film 116, that is made of a material prepared by mixing 0.5 atomic % Sb in a mixture of GeTe and $In_2Te_3$ in a mixing ratio of 31:1, a 4 nm thick $(ZrO_2)_{25}(SiO_2)_{25}(Cr_2O_3)_{50}$ (mol %) film serving as a second interface film 117, a $(ZnS)_{80}(SiO_2)_{20}$ (mol %) film serving as a second dielectric film 118, and a 10 nm thick $Al_2O_3$ film serving as a third dielectric film 119 by the sputtering method.

The thickness of the second dielectric film 118 was determined by calculation based on the matrix method. Specifically, the thickness was determined so that when a laser beam with a wavelength of 405 nm was applied, the second information layer 14 had Rcg (reflectance when the recording film 116 is in a crystal phase) of 4% to 6%, and the transmittance of 46% to 50% provided that the third information layer 16 was not included.

Subsequently, an intermediate separation layer 15 (having a thickness of 18 μm) with a guide groove formed therein was formed on the first information layer 14, and a third information layer 16 was formed on the intermediate separation layer 15. The third information layer 16 was formed by sequentially forming a 7 nm thick isolation film 120, a 18 nm thick $(Bi_2O_3)_{40}(TiO_2)_{60}$ (mol %) serving as a transmittance adjusting film 121, a 7 nm thick Ag—Pd—Cu (containing 96% by weight or more of Ag) film serving as a reflective film 122, a 7 nm thick $(ZrO_2)_{40}(SiO_2)_{40}(Cr_2O_3)_{20}$ film serving as a first dielectric film 123, a 3 nm thick $(ZrO_2)_{25}(SiO_2)_{25}(Cr_2O_3)_{50}$ (mol %) film serving as a first interface film 124, a 0.8 nm thick $Ge_{14.3}Bi_{28.6}Te_{57.1}$ (atomic %) film serving as a nucleation film 125, a 6 nm thick $Ge_{46.0}In_{3.0}Sb_{0.5}Te_{50.5}$ (atomic %) film serving as a recording film 126, that is made of a material prepared by mixing 0.5 atomic % Sb in a mixture of GeTe and $In_2Te_3$ in a mixing ratio of 31:1, a 3 nm thick $(ZrO_2)_{25}(SiO_2)_{25}(Cr_2O_3)_{50}$ (mol %) film serving as a second interface film 127, a $(ZnS)_{80}(SiO_2)_{20}$ (mol %) film serving as a second dielectric film 128, and a 10 nm thick $Al_2O_3$ film serving as a third dielectric film 129 by the sputtering method.

The thickness of the second dielectric film 128 was determined by calculation based on the matrix method. Specifically, the thickness was determined so that when a laser beam with a wavelength of 405 nm was applied, the third information layer 16 had Rcg (reflectance when the recording film 126 is in a crystal phase) of 2 to 4%, and the transmittance of 55% to 59%.

Thereafter, an ultraviolet curable resin was applied to the third dielectric film 129 and, after spin coating, the resin was cured with ultraviolet rays thereby to form a cover layer 17, and thus completing the information recording medium 1. Finally, an initialization process was carried out for crystallizing the whole area of the recording film 104 of the first information layer 12, the recording film 116 of the second information layer 14, and the recording film 126 of the third information layer 16, with laser beam.

In the present Example, seven kinds of information recording media were manufactured, in which the isolation films 120 of the third information layers 16 were made of $SiO_2$, $Al_2O_3$, $Al_6Si_2O_{13}$, MgO, $MgSiO_3$, $LaF_3$ and $CeF_3$ respectively. These discs were numbered as 1-101 to 1-107, respectively.

For comparison, in information recording media with the above-mentioned configuration, an information recording medium of which configuration was the above-mentioned one except that the isolation film 120 was not provided (this disc is numbered as 1-001) and information recording media in which the isolation films 120 were formed of $Ta_2O_5$ and $SnO_2$, respectively (these discs are numbered as 1-002 and 1-003, respectively), were manufactured.

With respect to the thus manufactured information recording medium 1 and information recording media of Comparative Examples, the following evaluations were carried out. First, with respect to each of the above materials that constitute the isolation film 129, optical constants (a refractive index n and an extinction coefficient k) at a wavelength of 405 nm were measured using a spectroscopic ellipsometer. Next, using a spectrophotometer, a transmittance of the third information layer 16 of the above discs to laser beam having a wavelength of 405 nm was measured. The results are shown in Table 1.

TABLE 1

| Disc No | | Material for Isolation Film 120 | Optical Constant of Isolation Film 120 (@405 nm) n-ik | Transmittance of Third Information Layer 16 (%) |
|---|---|---|---|---|
| Example | 1-101 | $SiO_2$ | 1.46-i0.01 | 57.7 |
| | 1-102 | $Al_2O_3$ | 1.65-i0.01 | 57.4 |
| | 1-103 | $Al_6Si_2O_{13}$ | 1.57-i0.02 | 57.0 |
| | 1-104 | MgO | 1.69-i0.01 | 56.9 |
| | 1-105 | $MgSiO_3$ | 1.56-i0.01 | 57.3 |
| | 1-106 | $LaF_3$ | 1.68-i0.05 | 56.2 |
| | 1-107 | $CeF_3$ | 1.60-i0.02 | 56.8 |
| Comparative Example | 1-001 | Not formed | — | 57.5 |
| | 1-002 | $Ta_2O_5$ | 2.22-i0.05 | 54.9 |
| | 1-003 | $SnO_2$ | 2.34-i0.13 | 53.1 |

As shown in Table 1, all the information recording media 1 (Disc Nos. 1-101 to 1-107) in the present example had the same transmittance as that of the medium including no isolation film 120 (Disc No. 1-001). In contrast, transmittance of each of Disc Nos. 1-002 and 1-003 of as comparative examples was at least 2% smaller than that of Disc No. 1-001. This is because the isolation film 120 of Disc Nos. 1-002 and 1-003 had a high refractive index n, or a large extinction coefficient k. These results revealed that it is necessary for the material of the isolation film to have a refractive index of 1.8 or less and an extinction coefficient of 0.05 or less so as to suppress a decrease in transmittance that is caused by formation of the isolation film.

Next, repeated overwriting characteristics of the third information layer 16 of information recording media of the examples and the comparative examples were evaluated using a drive defined in accordance with "BD-XL" Standard that is large capacity Blu-ray Disc Standard. Using an optical system in which a wavelength of laser beam was 405 nm and the numerical aperture NA of the object lens was 0.85, information was recorded in the groove. The linear velocity of recording and reproduction was 7.36 m/s (2× speed). Random signals of 2 T to 9 T in which the shortest mark length (2 T) was 0.111 μm were recorded in each information layer. Record density per information layer was 33.4 GB. Reproduction was carried out at 1.2 mW for the first and second information layers, while reproduction was carried out at 0.9 mW for the third information layer. Laser beam subjected to high frequency superposition (modulation) at 2:1 was used as reproduced light.

Repeated overwriting characteristics were evaluated by the measurement of a symbol error rate (SER). Before repeated recording, learning of record power and record compensation was carried out in each information recording medium, and repeated recording was carried out under recording conditions where SER was optimized. A record interval was set to 30 minutes, and a medium was left to stand in a thermostatic bath at 50° C. and 20% RH during the interval between recordings. Repeated recording was carried out 100 times.

The medium in which SER after recording 100 times (direct overwrite 100 (DOW100)) was $3.0 \times 10^{-3}$ or less was rated "++", the medium in which SER was more than $3.0 \times 10^{-3}$ and $5.2 \times 10^{-3}$ or less was rated "+", the medium in which SER was more than $5.2 \times 10^{-3}$ and $8.0 \times 10^{-3}$ or less was rated "±", and the medium in which SER was more than $8.0 \times 10^{-3}$ was rated "−", respectively.

Media of Disc Nos. 1-101 to 1-107, and the medium of Disc No. 1-001 as the comparative example were evaluated. The evaluation results are shown in Table 2.

TABLE 2

| Disc No. | | Material for Isolation Film 120 | Repeated Overwriting Characteristics | |
|---|---|---|---|---|
| | | | SER | Judgment |
| Example | 1-101 | SiO$_2$ | $1.3 \times 10^{-3}$ | ++ |
| | 1-102 | Al$_2$O$_3$ | $1.5 \times 10^{-3}$ | ++ |
| | 1-103 | Al$_6$Si$_2$O$_{13}$ | $2.0 \times 10^{-3}$ | ++ |
| | 1-104 | MgO | $3.4 \times 10^{-3}$ | + |
| | 1-105 | MgSiO$_3$ | $2.6 \times 10^{-3}$ | ++ |
| | 1-106 | LaF$_3$ | $3.2 \times 10^{-3}$ | + |
| | 1-107 | CeF$_3$ | $6.1 \times 10^{-3}$ | ± |
| Comparative Example | 1-001 | Not formed | $>1.0 \times 10^{-1}$ (unmeasurable) | − |

As shown in Table 2, all the information recording media 1 of the examples (Disc Nos. 1-101 to 1-107) had improved repeated overwriting characteristics under the environment at 50° C. as compared with Comparative Example 1-001. The medium rated as "±" in the evaluation of repeated overwriting characteristics can be put into practice without any problems.

Next, moisture resistance of the third information layer 16 of information recording media of the examples and the comparative examples was evaluated using a drive defined in accordance with "BD-XL" Standard. The drive used had the same technical specification as that used in the evaluation of repeated overwriting characteristics. First, random signals of 2 T to 9 T were recorded at normal temperature and then direct overwrite 10 (DOW10) recording was carried out. After recording, the disc was left to stand in a thermostatic bath under the conditions at 85° C. and 85% RH for 100 hours and an acceleration test was carried out. Then, record signals were reproduced at normal temperature. The medium in which SER was $1.0 \times 10^{-3}$ or less was rated "+", the medium in which SER was more than $1.0 \times 10^{-3}$ and $4.2 \times 10^{-3}$ or less was rated "±", and the medium in which SER was more than $4.2 \times 10^{-3}$ was rated "−", respectively.

Media of Disc Nos. 1-101 to 1-107, and the medium of Disc No. 1-001 as the comparative example were evaluated. The evaluation results are shown in Table 3.

TABLE 3

| Disc No. | | Material for Isolation Film 120 | Moisture Resistance (Judgment) |
|---|---|---|---|
| Example | 1-101 | SiO$_2$ | + |
| | 1-102 | Al$_2$O$_3$ | + |
| | 1-103 | Al$_6$Si$_2$O$_{13}$ | + |
| | 1-104 | MgO | ± |
| | 1-105 | MgSiO$_3$ | ± |
| | 1-106 | LaF$_3$ | ± |
| | 1-107 | CeF$_3$ | ± |
| Comparative Example | 1-001 | Not formed | + |

As shown in Table 3, moisture resistance of media of Disc Nos. 1-101 to 1-103 was identical to that of the comparative example. This reveals that an oxide of at least one element selected from Si and Al is more preferred as the material of the isolation film 120. The medium rated as "±" in the evaluation of moisture resistance can be put into practice without any problems.

As is apparent from the results shown in Table 1 to Table 3, the medium with the isolation film 120 of SiO$_2$ or Al$_2$O$_2$, or Al$_6$Si$_2$O$_{13}$ scarcely caused a decrease in transmittance and had identical moisture resistance, and also exhibited improved repeated overwriting characteristics as compared with the medium including no isolation film 120. This reveals that SiO$_2$ or Al$_2$O$_3$, or Al$_6$Si$_2$O$_{13}$ is more preferred as the material of the isolation film 120.

As mentioned above, according to the present invention, an information recording medium having repeated rewriting characteristics, that are superior to those of a conventional medium, could be obtained.

Example 2

In the present example, another example of an information recording medium 1 shown in FIG. 1 will be described. In the present example, the isolation film 120 of the third information layer 16 of the information recording medium 1 was formed of SiO$_2$ varying the thickness thereof. Transmittance and repeated overwriting characteristics of the third information layer 16 were evaluated.

In the present Example, the media were manufactured such that the thicknesses of the respective isolation films 120 were 2 nm, 3 nm, 5 nm, 7 nm, 10 nm, 15 nm and 20 nm. Other configurations were the same as those in Example 1. These discs are numbered as 2-101 to 1-107, respectively (the medium of No. 2-104 has the same configuration as that of the medium 1-101 in Example 1).

With respect to these information recording media 1, transmittance and repeated overwriting characteristics under the atmosphere at 50° C. of the third information layer 16 were evaluated. The respective evaluation methods are the same as those in Example 1.

The media of Disc Nos. 2-101 to 1-107, and the medium of Disc No. 1-001 the comparative example were evaluated. The evaluation results are shown in Table 4.

TABLE 4

| Disc No. | | Thickness of Isolation Film 120 | Transmittance of Third Information Layer 16 (%) | Repeated Overwriting Characteristics | |
|---|---|---|---|---|---|
| | | | | SER | Judgement |
| Example | 2-101 | 2 nm | 57.6 | $7.9 \times 10^{-3}$ | ± |
| | 2-102 | 3 nm | 57.7 | $4.8 \times 10^{-3}$ | + |
| | 2-103 | 5 nm | 57.8 | $2.0 \times 10^{-3}$ | ++ |
| | 2-104 | 7 nm | 57.7 | $1.3 \times 10^{-3}$ | ++ |
| | 2-105 | 10 nm | 57.8 | $1.7 \times 10^{-3}$ | ++ |

TABLE 4-continued

| Disc No. | | Thickness of Isolation Film 120 | Transmittance of Third Information Layer 16 (%) | Repeated Overwriting Characteristics | |
|---|---|---|---|---|---|
| | | | | SER | Judgement |
| | 2-106 | 15 nm | 57.5 | $2.2 \times 10^{-3}$ | ++ |
| | 2-107 | 20 nm | 57.1 | $4.4 \times 10^{-3}$ | + |
| Comparative Example | 1-001 | Not formed | 57.5 | $>1.0 \times 10^{-1}$ (Unmeasurable) | − |

As shown in Table 4, all the information recording media 1 (Disc Nos. 2-101 to 2-107) of the present examples had improved repeated overwriting characteristics under the environment at 50° C. as compared with the comparative example 1-001. Since the isolation film 120 having a thickness of 2 nm might exert slightly less isolation effect, repeated overwriting characteristics of the medium of Disc No. 2-101 were slightly inferior as compared with media of other examples.

Not shown in the table, an information recording medium in which the isolation film 120 had a thickness of 25 nm was also manufactured, and then repeated overwriting characteristics were evaluated. As a result, characteristics were satisfactory. However, as mentioned in the first embodiment, when the thickness of the isolation film 120 is more than 20 nm, the film formation time of the isolation film 120 is more than 18 seconds, resulting in high manufacturing costs of the information recording medium. Actually, since about 23 seconds were required to form a 25 nm thick isolation film 120, mass-production of the medium with this configuration was considered to be difficult at the present time.

From these results, it was found that the thickness of the isolation film 120 was more preferably 3 nm or more and 20 nm or less.

Example 3

In the present example, another example of an information recording medium 1 shown in FIG. 1 will be described. The present example illustrates an example in which the isolation film 120 of the third information layer 16 of the information recording medium 1 is formed of $SiO_2$ and the transmittance adjusting film 121 is formed of $(Bi_2O_3)_{33.3}(TiO_2)_{66.7}$ (mol %).

In the present example, a 7 nm thick film of $SiO_2$ was formed as the isolation film 120 and a 19 nm thick film of $(Bi_2O_3)_{33.3}(TiO_2)_{66.7}$ (mol %) was formed as the transmittance adjusting film 121 thereby to manufacture an information recording medium. Other configurations were the same as those in Example 1. Disc No. of this medium is 3-101. An information recording medium with the same configuration as in the medium No. 301, except that the isolation film 120 is not included, was manufactured as the comparative example. Disc No. of this medium is 3-001.

With respect to the information recording medium 1, transmittance and repeated overwriting characteristics under the atmosphere at 50° C. of the third information layer 16 were evaluated. The respective evaluation methods were the same as those in Example 1.

Media of Disc Nos. 3-101 and 3-001 were evaluated. The evaluation results are shown in Table 5.

TABLE 5

| Disc No. | | Material for Isolation Film 120 | Transmittance of Third Information Layer 16 (%) | Repeated Overwriting Characteristics | |
|---|---|---|---|---|---|
| | | | | SER | Judgement |
| Example | 3-101 | $SiO_2$ | 57.4 | $1.5 \times 10^{-3}$ | ++ |
| Comparative Example | 3-001 | Not formed | 57.5 | $>1.0 \times 10^{-1}$ ((Unmeasurable)) | − |

As shown in Table 5, the information recording medium 1 (Disc No. 3-101) of the present example also has the transmittance equivalent to that of Comparative Example 3-001, and repeated overwriting characteristics under the environment at 50° C. of the medium of Disc No. 3-101 were excellent as compared with Comparative Example 3-001.

Example 4

In the present Example, another example of an information recording medium 1 shown in FIG. 1 will be described. In the present Example, the isolation film 120 of the third information layer 16 of the information recording medium 1 was formed of $SiO_2$ and the material of the third dielectric film 129 was varied. Transmittance, moisture resistance and repeated rewriting characteristics of the third information layer 16 were evaluated.

In the present Example, information recording media were manufactured by forming a 7 nm thick film of $SiO_2$ as the isolation film 120, and forming films of $SiO_2$, $Al_2O_3$, $Al_6Si_2O_{13}$, MgO, $MgSiO_3$, $LaF_3$ and $CeF_3$ respectively as the third dielectric film 129. In each case wherein any of the materials was used, the thickness of the third dielectric film 129 was 10 nm. These discs are numbered as 4-101 to 4-107, respectively (4-102 is a disc having the same configuration as that of 1-101 in Example 1).

An information recording medium with the same configuration as that of each of Nos. 4-101 to 4-107, except that the third dielectric film 129 was not included, was manufactured as a comparative example. Disc No. of this medium is 4-001.

With respect to these information recording media 1, transmittance, moisture resistance and repeated overwriting characteristics under the atmosphere at 50° C. of the third information layer 16 were evaluated. The respective evaluation methods were as the same as in Example 1.

Media of Disc Nos. 4-101 to 4-107, and the medium of disc No. 4-001 as the comparative example were evaluated. The evaluation results are shown in Table 6.

TABLE 6

| Disc No. | | Material for Third Dielectric Film 129 | Transmittance of Third Information Layer 16 (%) | Moisture Resistance (Judgment) | Repeated Overwriting Characteristics | |
|---|---|---|---|---|---|---|
| | | | | | SER | Judgment |
| Example | 4-101 | $SiO_2$ | 57.5 | + | $2.8 \times 10^{-3}$ | ++ |
| | 4-102 | $Al_2O_3$ | 57.7 | + | $1.3 \times 10^{-3}$ | ++ |
| | 4-103 | $Al_6Si_2O_{13}$ | 56.9 | + | $1.9 \times 10^{-3}$ | ++ |
| | 4-104 | MgO | 57.4 | ± | $6.4 \times 10^{-3}$ | ± |
| | 4-105 | $MgSiO_3$ | 57.2 | ± | $3.5 \times 10^{-3}$ | + |
| | 4-106 | $LaF_3$ | 56.8 | ± | $4.0 \times 10^{-3}$ | + |
| | 4-107 | $CeF_3$ | 56.6 | ± | $5.6 \times 10^{-3}$ | ± |
| Comparative Example | 4-001 | Not Formed | 57.5 | + | $9.2 \times 10^{-3}$ | − |

As shown in Table 6, all the information recording media 1 (Disc Nos. 4-101 to 4-107) in the present example had the transmittances equivalent to that of comparative example 4-001. The repeated overwriting characteristics under the environment at 50° C. of all the media of the present examples were improved as compared with Comparative Example. Moisture resistances of Disc Nos. 4-101 to 4-103 were identical to that of the comparative example 4-001. This reveals that an oxide of at least one element selected from Si and Al is more preferred as the material of the third dielectric film 129. The medium rated as "±" in the evaluation of repeated overwriting characteristics and moisture resistance can be put into practice without any problems.

As is apparent from the results shown in Table 6, the medium with the third dielectric film 129 of $SiO_2$ or $Al_2O_3$, or $Al_6Si_2O_{13}$ scarcely caused a decrease in transmittance and had identical moisture resistance, and also exhibited improved repeated overwriting characteristics as compared with the medium including no third dielectric film 129. This reveals that $SiO_2$ or $Al_2O_3$, or $Al_6Si_2O_{13}$ is more preferred as the material of the third dielectric film 129.

As described above, according to the present invention, an information recording medium of which repeated overwriting characteristics are superior to those of a conventional medium, could be obtained.

Example 5

In the present Example, another example of an information recording medium 1 shown in FIG. 1 will be described. In the present example, the isolation film 120 of the third information layer 16 of the information recording medium 1 was formed of $SiO_2$ and the thickness of the third dielectric film 129 was varied. Transmittance and repeated overwriting characteristics of the third information layer 16 were evaluated by.

In the present example, a 7 nm thick film of $SiO_2$ was formed as the isolation film 120 and a film of $Al_2O_3$ was formed as the third dielectric film 129 thereby to manufacture an information recording medium. The thicknesses of the respective third dielectric films 129 were 3 nm, 5 nm, 7 nm, 10 nm, 15 nm and 20 nm. Other configurations were the same as those in Example 1. These discs are numbered as 5-101 to 5-106, respectively (the medium of No. 5-104 has the same configuration as that of the medium 1-101 in Example 1).

With respect to these information recording media 1, transmittance and repeated overwriting characteristics under the atmosphere at 50° C. of the third information layer 16 were evaluated. The respective evaluation methods were the same as those in Example 1.

Media of Disc Nos. 5-101 to 5-106 were evaluated. The evaluation results are shown in Table 7.

TABLE 7

| Disc No. | | Thickness of Third Dielectric Film 129 | Transmittance of Third Information Layer 16 (%) | Repeated Overwriting Characteristics | |
|---|---|---|---|---|---|
| | | | | SER | Judgement |
| Example | 5-101 | 3 nm | 57.7 | $7.2 \times 10^{-3}$ | ± |
| | 5-102 | 5 nm | 57.9 | $4.1 \times 10^{-3}$ | + |
| | 5-103 | 7 nm | 57.8 | $2.1 \times 10^{-3}$ | ++ |
| | 5-104 | 10 nm | 57.7 | $1.3 \times 10^{-3}$ | ++ |
| | 5-105 | 15 nm | 57.5 | $1.8 \times 10^{-3}$ | ++ |
| | 5-106 | 20 nm | 57.0 | $3.6 \times 10^{-3}$ | ++ |

As shown in Table 7, all the information recording media Nos. 5-102 to 5-106 of the present example had satisfactory repeated overwriting characteristics under the environment at 50° C. Since the third dielectric 129 having a thickness of 3 nm might exert slightly less isolation effect, repeated overwriting characteristics of the medium of disc No. 5-101 were slightly inferior as compared with media of other examples.

Not shown in the table, an information recording medium in which the third dielectric 129 had a thickness of 25 nm was also manufactured, and then repeated overwriting characteristics were evaluated. As a result, characteristics were satisfactory. However, as mentioned in the first embodiment, when the thickness of third dielectric 129 is more than 20 nm, the film formation time of third dielectric 129 is more than 18 seconds, resulting in high manufacturing costs of the information recording medium. Actually, since about 27 seconds were required to form a 25 nm thick isolation film 120, mass production of the medium with this configuration was considered to be difficult at the present time.

From these results, it was found that the thickness of third dielectric 129 was more preferably 5 nm or more and 20 nm or less.

Example 6

In the present example, another example of an information recording medium 1 shown in FIG. 1 will be described. In the present example, the isolation film 120 of the third information layer 16 of the information recording medium 1 was formed of $SiO_2$ and also the isolation film 110 of the second information layer 14 was formed. Then transmittance and repeated overwriting characteristics of the second information layer 14 were evaluated.

In the present example, an information recording medium with the same configuration as in Example 1 was manufactured, except that a 7 nm thickness film of $SiO_2$ was formed as the isolation film 110 of the second information layer 14. Disc No. of this medium is 6-101. An information recording medium in which the second information layer 14 did not include the isolation film 110 was manufactured as a comparative example. Disc No. of this medium is 6-001.

With respect to the information recording medium 1, transmittance and repeated overwriting characteristics under the atmosphere at 50° C. of the second information layer 14 were evaluated. The respective evaluation methods were the same as those in Example 1.

Media of Disc Nos. 6-101 and 6-001 were evaluated. The evaluation results are shown in Table 8.

TABLE 8

| Disc No. | | Material for Isolation Film 110 | Transmittance of Second Information Layer 14 (%) | Repeated Overwriting Characteristics | |
|---|---|---|---|---|---|
| | | | | SER | Judgement |
| Example | 6-101 | $SiO_2$ | 47.5 | $8.8 \times 10^{-4}$ | ++ |
| Comparative Example | 6-001 | Not formed | 47.6 | $6.2 \times 10^{-3}$ | ± |

As shown in Table 8, the transmittance of the second information layer 14 of the medium (No. 6-101) of the present example was the same as that of the second information layer 14 of the medium (No. 6-001) of the comparative example. Repeated overwriting characteristics under the environment at 50° C. of the medium of No. 6-101 were improved as compared with those of the comparative example. Since more satisfactory SER and margin thereof are required in the second information layer 14 as compared with those in the third information layer 16, the medium having repeated overwriting characteristics rated as "±" lacks in practicability.

As described above, according to the present invention, an information recording medium of which repeated overwriting characteristics were superior to those of a conventional medium, was obtained.

While a description was made below by way of embodiments of the present invention, the present invention is not limited to the above embodiments, as mentioned above, and the present invention can also be applied to other embodiments based on the technical idea of the present invention. For example, in an information recording medium including four or five information layers obtained by further increasing the number of information layers as compared with the first embodiment, the same effect can be obtained by forming an isolation film or an isolation film and a third dielectric film in a semi-transmission information layer located on the light incident side. In a multi-layered information recording medium including a plurality of information layers, any one of information layers may be either write-once or read-only type information layer.

INDUSTRIAL APPLICABILITY

The information recording medium of the present invention is excellent in repeated overwriting characteristics even under severe environment, and is useful as a large capacity optical information recording medium, for example, a rewritable multi-layered Blu-ray Disc including three or four information layers. The present invention can also be applied to a small diameter disc having a diameter in a range of from 6 cm to 8 cm. The present invention is useful as a rewritable information recording medium capable of performing near-field optical high density recording that uses an optical system of NA>1, for example, an optical system using SIL or SIM, or next generation rewritable multi-layered information recording medium.

REFERENCE SIGNS LIST

1: Information recording medium
12, 14, 16: Information layer
11: Substrate
101, 112, 122: Reflective film
102, 113, 123: First dielectric film
106, 118, 128: Second dielectric film
119, 129: Third dielectric film
103, 114, 124: First interface film
105, 117, 127: Second interface film
104, 116, 126: Recording film
110, 120: Isolation film
111, 121: Transmittance adjusting film
115, 125: Nucleation film
13, 15: Intermediate separation film
17: Cover layer
10: Laser beam (energy beam)

The invention claimed is:

1. An information recording medium comprising three or more information layers and being capable of recording and reproducing information by irradiation with light, which is characterized in that at least one information layer provided on the light incident side is an information layer capable of overwriting information and comprises at least a recording film, a transmittance adjusting film of a dielectric comprising Bi, Ti and O, and an isolation film in this order from the light incident side; the isolation film is provided between and adjacent to the transmittance adjusting film and an intermediate separation layer that separates the information layer from another information layer on the side opposite to the light incident side; the isolation film has an optical constant at a wavelength of 405 nm such that a refractive index is 1.8 or less and an extinction coefficient is 0.05 or less; and the isolation film comprises at least one compound selected from oxides and complex oxides of at least one element selected from Si, Al and Mg and fluorides of at least one element selected from La and Ce in an amount more than 50 mol %.

2. The information recording medium according to claim 1, wherein the isolation film comprises at least one compound selected from $SiO_2$, $Al_2O_3$, $Al_6Si_2O_{13}$, MgO, $MgSiO_3$, $LaF_3$ and $CeF_3$ in an amount of more than 50 mol %.

3. The information recording medium according to claim 1, wherein the isolation film consists substantially of $SiO_2$ or $Al_2O_3$, or $Al_6Si_2O_{13}$.

4. The information recording medium according to claim 1, wherein a thickness of the isolation film is 3 nm or more and 20 nm or less.

5. The information recording medium according to claim 1, which is characterized in that the at least one information layer that is provided on the light incident side and comprises the isolation film, comprises at least a third dielectric film, a second dielectric film, the recording film, and a first dielectric film in this order from the light incident side, wherein the third dielectric film is provided between and adjacent to the second dielectric film and the intermediate separation layer which separates the information layer from another information layer on the light incident side or a cover layer which protects the information layer; the second dielectric film comprises ZnS and $SiO_2$; and the third dielectric film has an optical constant at a wavelength of 405 nm such that a refractive index is 1.8 or less and an extinction coefficient is 0.05 or less.

6. The information recording medium according to claim 5, wherein the third dielectric film comprises an oxide of at least one element selected from Si and Al.

7. The information recording medium according to claim 5, wherein the third dielectric film consists substantially of $SiO_2$ or $Al_2O_3$, or $Al_6Si_2O_{13}$.

8. The information recording medium according to claim 5, wherein a thickness of the third dielectric film is 5 nm or more and 20 nm or less.

9. A method for manufacturing an information recording medium comprising three or more information layers and being capable of recording and reproducing information by light, which is characterized by comprising three or more steps of forming an information layer, wherein the step of forming at least one information layer comprises a step of forming a transmittance adjusting film of a dielectric containing Bi, Ti and O, a step of forming an isolation film and a step of forming a recording film capable of causing reversible phase change between a crystal phase and an amorphous phase by irradiation with light;

the step of forming the isolation film is continuously carried out after forming an intermediate separation layer which separates the information layer from another information layer on the side opposite to the light incident side, and includes sputtering of a target so as to obtain a film (i) which has an optical constant at a wavelength of 405 nm such that a refractive index is 1.8 or less and an extinction coefficient is 0.05 or less and (ii) which comprises at least one compound selected from oxides and complex oxides of at least one element selected from Si, Al and Mg and fluorides of at least one element selected from La and Ce in an amount more than 50 mol %; and the step of forming the transmittance adjusting film is continuously carried out after forming the isolation film, and includes sputtering of a target of a dielectric containing Bi, Ti and O.

10. The method for manufacturing an information recording medium according to claim 9, wherein the target used for forming the isolation film consists substantially of $SiO_2$ or $Al_2O_3$, or $Al_6Si_2O_{13}$.

11. The method for manufacturing an information recording medium according to claim 9, wherein the step of forming the at least one information layer comprising the step of forming the transmittance adjusting film, the step of forming the isolation film and the step of forming the recording film, further comprises the steps of forming a third dielectric film and forming a second dielectric film;

the step of forming the second dielectric film comprises sputtering using a target of a dielectric containing ZnS and $SiO_2$;

the step of forming the third dielectric film is continuously carried out after forming the second dielectric film, and comprises sputtering using a target of a dielectric containing an oxide of at one element selected from Si and Al; and an intermediate separation layer that separates the information layer from another information layer on the light incident side, or a cover layer that protects the information layer is continuously formed after carrying out the step of forming the third dielectric film.

12. The method for manufacturing an information recording medium according to claim 11, wherein the target used for forming the third dielectric film consists substantially of $SiO_2$ or $Al_2O_3$, or $Al_6Si_2O_{13}$.

* * * * *